(12) United States Patent
Chtchetinine et al.

(10) Patent No.: US 8,339,378 B2
(45) Date of Patent: Dec. 25, 2012

(54) INTERACTIVE INPUT SYSTEM WITH MULTI-ANGLE REFLECTOR

(75) Inventors: Alex Chtchetinine, Calgary (CA); Vaughn E. Keenan, Calgary (CA)

(73) Assignee: SMART Technologies ULC (CA)

( * ) Notice: Subject to any disclaimer, the term of this patent is extended or adjusted under 35 U.S.C. 154(b) by 1082 days.

(21) Appl. No.: 12/265,630

(22) Filed: Nov. 5, 2008

(65) Prior Publication Data

US 2010/0110005 A1    May 6, 2010

(51) Int. Cl.
*G06F 3/042*    (2006.01)

(52) U.S. Cl. .................. 345/175; 178/18.09; 178/19.05

(58) Field of Classification Search .................. 345/158, 345/173, 175, 176, 179–183; 178/18.01, 178/18.09, 18.11, 19.01, 19.05, 20.01; 359/619, 359/629; 250/221, 559.12; 385/131, 133
See application file for complete search history.

(56) References Cited

U.S. PATENT DOCUMENTS

| | | |
|---|---|---|
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,879 A | 1/1981 | Carroll et al. |
| 4,247,767 A | 1/1981 | O'Brien et al. |
| 4,420,261 A | 12/1983 | Barlow et al. |
| 4,459,476 A | 7/1984 | Weissmueller et al. |
| 4,468,694 A | 8/1984 | Edgar |
| 4,507,557 A | 3/1985 | Tsikos |
| 4,550,250 A | 10/1985 | Mueller et al. |
| 4,553,842 A | 11/1985 | Griffin |
| 4,558,313 A | 12/1985 | Garwin et al. |
| 4,639,720 A | 1/1987 | Rympalski et al. |

(Continued)

FOREIGN PATENT DOCUMENTS

AU    2003233728 A1    12/2003

(Continued)

OTHER PUBLICATIONS

"White Paper", Digital Vision Touch Technology, Feb. 2003.

(Continued)

*Primary Examiner* — Abbas Abdulselam

(74) *Attorney, Agent, or Firm* — Katten Muchin Rosenman LLP

(57) ABSTRACT

An interactive input system comprises a pointer input region; and a multi-angle reflecting structure located along a single side of the pointer input region and operable to reflect radiation from a pointer within the pointer input region from at least two surface locations of the multi-angle reflecting structure, wherein the at least two surface locations each have different respective angles. An imaging system is operable to capture within at least a portion of the pointer input region images of the reflected radiation located within a field of view of the imaging system. Processing structure is provided for determining the location of the pointer relative to the pointer input region based on the at least one image.

25 Claims, 30 Drawing Sheets

U.S. PATENT DOCUMENTS

| | | |
|---|---|---|
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,097,516 A | 3/1992 | Amir |
| 5,103,085 A | 4/1992 | Zimmerman |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,179,369 A | 1/1993 | Person et al. |
| 5,196,835 A | 3/1993 | Blue et al. |
| 5,196,836 A | 3/1993 | Williams |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,854,491 A | 12/1998 | Pryor et al. |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura |
| 6,002,808 A | 12/1999 | Freeman |
| 6,008,798 A | 12/1999 | Mato, Jr. et al. |
| 6,031,531 A | 2/2000 | Kimble |
| 6,061,177 A | 5/2000 | Fujimoto |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,144,366 A | 11/2000 | Numazaki et al. |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,232,962 B1 | 5/2001 | Davis et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,320,597 B1 | 11/2001 | Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 | 11/2002 | Sano et al. |
| 6,496,122 B2 | 12/2002 | Sampsell |
| 6,497,608 B2 | 12/2002 | Ho et al. |

| | | | | | | |
|---|---|---|---|---|---|---|
| 6,498,602 B1 | 12/2002 | Ogawa | 7,184,030 B2 | 2/2007 | McCharles et al. | |
| 6,504,532 B1 | 1/2003 | Ogasahara et al. | 7,187,489 B2 | 3/2007 | Miles | |
| 6,507,339 B1 | 1/2003 | Tanaka | 7,190,348 B2 | 3/2007 | Kennedy et al. | |
| 6,512,513 B2 | 1/2003 | Fleck et al. | 7,190,496 B2 | 3/2007 | Klug et al. | |
| 6,512,838 B1 | 1/2003 | Rafii et al. | 7,202,860 B2 | 4/2007 | Ogawa | |
| 6,517,266 B2 | 2/2003 | Saund | 7,227,526 B2 | 6/2007 | Hildreth et al. | |
| 6,518,600 B1 | 2/2003 | Shaddock | 7,232,986 B2 | 6/2007 | Worthington et al. | |
| 6,522,830 B2 | 2/2003 | Yamagami | 7,236,162 B2 | 6/2007 | Morrison et al. | |
| 6,529,189 B1 | 3/2003 | Colgan et al. | 7,237,937 B2 | 7/2007 | Kawashima et al. | |
| 6,530,664 B2 | 3/2003 | Vanderwerf et al. | 7,242,388 B2 | 7/2007 | Lieberman et al. | |
| 6,531,999 B1 | 3/2003 | Trajkovic | 7,265,748 B2 | 9/2007 | Ryynanen | |
| 6,532,006 B1 | 3/2003 | Takekawa et al. | 7,268,692 B1 | 9/2007 | Lieberman | |
| 6,540,366 B2 | 4/2003 | Keenan et al. | 7,274,356 B2 | 9/2007 | Ung et al. | |
| 6,540,679 B2 | 4/2003 | Slayton et al. | 7,283,126 B2 | 10/2007 | Leung | |
| 6,545,669 B1 | 4/2003 | Kinawi et al. | 7,283,128 B2 | 10/2007 | Sato | |
| 6,559,813 B1 | 5/2003 | DeLuca et al. | 7,289,113 B2 | 10/2007 | Martin | |
| 6,563,491 B1 | 5/2003 | Omura | 7,302,156 B1 | 11/2007 | Lieberman et al. | |
| 6,567,078 B2 | 5/2003 | Ogawa | 7,305,368 B2 | 12/2007 | Lieberman et al. | |
| 6,567,121 B1 | 5/2003 | Kuno | 7,330,184 B2 | 2/2008 | Leung | |
| 6,570,103 B1 | 5/2003 | Saka et al. | 7,333,094 B2 | 2/2008 | Lieberman et al. | |
| 6,570,612 B1 | 5/2003 | Saund et al. | 7,333,095 B1 | 2/2008 | Lieberman et al. | |
| 6,577,299 B1 | 6/2003 | Schiller et al. | 7,352,940 B2 * | 4/2008 | Charters et al. | 385/129 |
| 6,587,099 B2 | 7/2003 | Takekawa | 7,355,593 B2 | 4/2008 | Hill et al. | |
| 6,590,568 B1 | 7/2003 | Astala et al. | 7,372,456 B2 | 5/2008 | McLintock | |
| 6,594,023 B1 | 7/2003 | Omura et al. | 7,375,720 B2 | 5/2008 | Tanaka | |
| 6,597,348 B1 | 7/2003 | Yamazaki et al. | RE40,368 E | 6/2008 | Arnon | |
| 6,597,508 B2 | 7/2003 | Seino et al. | 7,411,575 B2 | 8/2008 | Hill et al. | |
| 6,603,867 B1 | 8/2003 | Sugino et al. | 7,414,617 B2 | 8/2008 | Ogawa | |
| 6,608,619 B2 | 8/2003 | Omura et al. | 7,479,949 B2 | 1/2009 | Jobs et al. | |
| 6,614,422 B1 | 9/2003 | Rafii et al. | 7,492,357 B2 | 2/2009 | Morrison et al. | |
| 6,624,833 B1 | 9/2003 | Kumar et al. | 7,499,037 B2 | 3/2009 | Lube | |
| 6,626,718 B2 | 9/2003 | Hiroki | 7,538,759 B2 | 5/2009 | Newton | |
| 6,630,922 B2 | 10/2003 | Fishkin et al. | 7,559,664 B1 | 7/2009 | Walleman et al. | |
| 6,633,328 B1 | 10/2003 | Byrd et al. | 7,619,617 B2 | 11/2009 | Morrison et al. | |
| 6,650,318 B1 | 11/2003 | Arnon | 7,692,625 B2 | 4/2010 | Morrison et al. | |
| 6,650,822 B1 | 11/2003 | Zhou | 2001/0019325 A1 | 9/2001 | Takekawa | |
| 6,674,424 B1 | 1/2004 | Fujioka | 2001/0022579 A1 | 9/2001 | Hirabayashi | |
| 6,683,584 B2 | 1/2004 | Ronzani et al. | 2001/0026268 A1 | 10/2001 | Ito | |
| 6,690,357 B1 | 2/2004 | Dunton et al. | 2001/0033274 A1 | 10/2001 | Ong | |
| 6,690,363 B2 | 2/2004 | Newton | 2001/0050677 A1 | 12/2001 | Tosaya | |
| 6,690,397 B1 | 2/2004 | Daignault, Jr. | 2001/0055006 A1 | 12/2001 | Sano et al. | |
| 6,710,770 B2 | 3/2004 | Tomasi et al. | 2002/0008692 A1 | 1/2002 | Omura et al. | |
| 6,714,311 B2 | 3/2004 | Hashimoto | 2002/0015159 A1 | 2/2002 | Hashimoto | |
| 6,720,949 B1 | 4/2004 | Pryor et al. | 2002/0036617 A1 | 3/2002 | Pryor | |
| 6,736,321 B2 | 5/2004 | Tsikos et al. | 2002/0041327 A1 | 4/2002 | Hildreth et al. | |
| 6,738,051 B2 | 5/2004 | Boyd et al. | 2002/0050979 A1 | 5/2002 | Oberoi et al. | |
| 6,741,250 B1 | 5/2004 | Furlan et al. | 2002/0064382 A1 | 5/2002 | Hildreth et al. | |
| 6,747,636 B2 | 6/2004 | Martin | 2002/0067922 A1 | 6/2002 | Harris | |
| 6,756,910 B2 | 6/2004 | Ohba et al. | 2002/0075243 A1 | 6/2002 | Newton | |
| 6,760,009 B2 | 7/2004 | Omura et al. | 2002/0080123 A1 | 6/2002 | Kennedy et al. | |
| 6,760,999 B2 | 7/2004 | Branc et al. | 2002/0118177 A1 | 8/2002 | Newton | |
| 6,774,889 B1 | 8/2004 | Zhang et al. | 2002/0145595 A1 | 10/2002 | Satoh | |
| 6,778,207 B1 | 8/2004 | Lee et al. | 2002/0163530 A1 | 11/2002 | Takakura et al. | |
| 6,803,906 B1 | 10/2004 | Morrison et al. | 2003/0001825 A1 | 1/2003 | Omura et al. | |
| 6,828,959 B2 | 12/2004 | Takekawa et al. | 2003/0025951 A1 | 2/2003 | Pollard et al. | |
| 6,829,372 B2 | 12/2004 | Fujioka | 2003/0043116 A1 | 3/2003 | Morrison et al. | |
| 6,864,882 B2 | 3/2005 | Newton | 2003/0046401 A1 | 3/2003 | Abbott et al. | |
| 6,911,972 B2 | 6/2005 | Brinjes | 2003/0063073 A1 | 4/2003 | Geaghan et al. | |
| 6,919,880 B2 | 7/2005 | Morrison et al. | 2003/0071858 A1 | 4/2003 | Morohoshi | |
| 6,927,384 B2 | 8/2005 | Reime et al. | 2003/0085871 A1 | 5/2003 | Ogawa | |
| 6,933,981 B1 | 8/2005 | Kishida et al. | 2003/0095112 A1 | 5/2003 | Kawano et al. | |
| 6,947,032 B2 | 9/2005 | Morrison et al. | 2003/0137494 A1 | 7/2003 | Tulbert | |
| 6,954,197 B2 | 10/2005 | Morrison et al. | 2003/0142880 A1 | 7/2003 | Hyodo | |
| 6,972,401 B2 | 12/2005 | Akitt et al. | 2003/0151532 A1 | 8/2003 | Chen et al. | |
| 6,972,753 B1 | 12/2005 | Kimura et al. | 2003/0151562 A1 | 8/2003 | Kulas | |
| 7,002,555 B1 | 2/2006 | Jacobsen et al. | 2003/0156118 A1 | 8/2003 | Ayinde | |
| 7,007,236 B2 | 2/2006 | Dempski et al. | 2003/0161524 A1 | 8/2003 | King | |
| 7,015,418 B2 | 3/2006 | Cahill et al. | 2003/0210803 A1 | 11/2003 | Kaneda et al. | |
| 7,030,861 B1 | 4/2006 | Westerman et al. | 2003/0227492 A1 | 12/2003 | Wilde et al. | |
| 7,057,647 B1 | 6/2006 | Monroe | 2004/0001144 A1 | 1/2004 | McCharles et al. | |
| 7,058,204 B2 | 6/2006 | Hildreth et al. | 2004/0012573 A1 | 1/2004 | Morrison et al. | |
| 7,075,054 B2 | 7/2006 | Iwamoto et al. | 2004/0021633 A1 | 2/2004 | Rajkowski | |
| 7,084,857 B2 | 8/2006 | Lieberman et al. | 2004/0031779 A1 | 2/2004 | Cahill et al. | |
| 7,084,859 B1 | 8/2006 | Pryor | 2004/0032401 A1 | 2/2004 | Nakazawa et al. | |
| 7,084,868 B2 | 8/2006 | Farag et al. | 2004/0046749 A1 | 3/2004 | Ikeda | |
| 7,098,392 B2 | 8/2006 | Sitrick et al. | 2004/0051709 A1 | 3/2004 | Ogawa et al. | |
| 7,121,470 B2 | 10/2006 | McCall et al. | 2004/0071363 A1 | 4/2004 | Kouri et al. | |
| 7,151,533 B2 | 12/2006 | Van Iperen | 2004/0108990 A1 | 6/2004 | Lieberman | |
| 7,176,904 B2 | 2/2007 | Satoh | 2004/0125086 A1 | 7/2004 | Hagermoser et al. | |

| | | | | | | |
|---|---|---|---|---|---|---|
| 2004/0149892 A1 | 8/2004 | Akitt et al. | CA | 2367864 A1 | 4/1993 | |
| 2004/0150630 A1 | 8/2004 | Hinckley et al. | CA | 2219886 A1 | 4/1999 | |
| 2004/0169639 A1 | 9/2004 | Pate et al. | CA | 2251221 A1 | 4/1999 | |
| 2004/0178993 A1 | 9/2004 | Morrison et al. | CA | 2267733 A1 | 10/1999 | |
| 2004/0178997 A1 | 9/2004 | Gillespie et al. | CA | 2268208 A1 | 10/1999 | |
| 2004/0179001 A1 | 9/2004 | Morrison et al. | CA | 2252302 A1 | 4/2000 | |
| 2004/0189720 A1 | 9/2004 | Wilson et al. | CA | 2350152 A1 | 6/2001 | |
| 2004/0201575 A1 | 10/2004 | Morrison | CA | 2412878 A1 | 1/2002 | |
| 2004/0204129 A1 | 10/2004 | Payne et al. | CA | 2341918 A1 | 9/2002 | |
| 2004/0218479 A1 | 11/2004 | Iwamoto et al. | CA | 2386094 A1 | 12/2002 | |
| 2004/0221265 A1 | 11/2004 | Leung et al. | CA | 2372868 A1 | 8/2003 | |
| 2004/0252091 A1 | 12/2004 | Ma et al. | CA | 2390503 A1 | 12/2003 | |
| 2005/0052427 A1 | 3/2005 | Wu et al. | CA | 2390506 A1 | 12/2003 | |
| 2005/0057524 A1 | 3/2005 | Hill et al. | CA | 2432770 A1 | 12/2003 | |
| 2005/0077452 A1 | 4/2005 | Morrison et al. | CA | 2493236 A1 | 12/2003 | |
| 2005/0083308 A1 | 4/2005 | Homer et al. | CA | 2448603 A1 | 5/2004 | |
| 2005/0104860 A1 | 5/2005 | McCreary et al. | CA | 2453873 A1 | 7/2004 | |
| 2005/0128190 A1 | 6/2005 | Ryynanen | CA | 2460449 A1 | 9/2004 | |
| 2005/0151733 A1 | 7/2005 | Sander et al. | CA | 2521418 A1 | 10/2004 | |
| 2005/0156900 A1 | 7/2005 | Hill et al. | CA | 2481396 A1 | 3/2005 | |
| 2005/0190162 A1 | 9/2005 | Newton | CA | 2491582 A1 | 7/2005 | |
| 2005/0241929 A1 | 11/2005 | Auger et al. | CA | 2563566 A1 | 11/2005 | |
| 2005/0243070 A1 | 11/2005 | Ung et al. | CA | 2564262 A1 | 11/2005 | |
| 2005/0248539 A1 | 11/2005 | Morrison et al. | CA | 2501214 A1 | 9/2006 | |
| 2005/0248540 A1 | 11/2005 | Newton | CA | 2606863 A1 | 11/2006 | |
| 2005/0270781 A1 | 12/2005 | Marks | CA | 2580046 A1 | 9/2007 | |
| 2005/0276448 A1 | 12/2005 | Pryor | CN | 1310126 C | 8/2001 | |
| 2006/0012579 A1 | 1/2006 | Sato | CN | 1784649 A | 6/2006 | |
| 2006/0022962 A1 | 2/2006 | Morrison et al. | CN | 101019096 A | 8/2007 | |
| 2006/0028456 A1 | 2/2006 | Kang | CN | 101023582 A | 8/2007 | |
| 2006/0034486 A1 | 2/2006 | Morrison et al. | CN | 1440539 A | 9/2009 | |
| 2006/0152500 A1 | 7/2006 | Weng | DE | 3836429 | 5/1990 | |
| 2006/0158437 A1 | 7/2006 | Blythe et al. | DE | 198 10 452 A1 | 12/1998 | |
| 2006/0170658 A1 | 8/2006 | Nakamura et al. | DE | 60124549 | 9/2007 | |
| 2006/0192799 A1 | 8/2006 | Vega et al. | EP | 0125068 A2 | 11/1984 | |
| 2006/0197749 A1 | 9/2006 | Popovich | EP | 0 279 652 A2 | 8/1988 | |
| 2006/0202953 A1 | 9/2006 | Pryor et al. | EP | 0 347 725 A2 | 12/1989 | |
| 2006/0227120 A1 | 10/2006 | Eikman | EP | 0420335 | 4/1991 | |
| 2006/0244734 A1 | 11/2006 | Hill et al. | EP | 0 657 841 A1 | 6/1995 | |
| 2006/0274067 A1 | 12/2006 | Hikai | EP | 0 762 319 A2 | 3/1997 | |
| 2006/0279558 A1 | 12/2006 | Van Delden et al. | EP | 0 829 798 A2 | 3/1998 | |
| 2007/0002028 A1 | 1/2007 | Morrison et al. | EP | 0897161 A1 | 2/1999 | |
| 2007/0019103 A1 | 1/2007 | Lieberman et al. | EP | 0911721 A2 | 4/1999 | |
| 2007/0075648 A1 | 4/2007 | Blythe et al. | EP | 1059605 A2 | 12/2000 | |
| 2007/0075982 A1 | 4/2007 | Morrison et al. | EP | 1262909 A2 | 12/2002 | |
| 2007/0089915 A1 | 4/2007 | Ogawa et al. | EP | 1739528 A1 | 1/2003 | |
| 2007/0116333 A1 | 5/2007 | Dempski et al. | EP | 1739529 A1 | 1/2003 | |
| 2007/0126755 A1 | 6/2007 | Zhang et al. | EP | 1420335 A2 | 5/2004 | |
| 2007/0139932 A1 | 6/2007 | Sun et al. | EP | 1 450 243 A2 | 8/2004 | |
| 2007/0152984 A1 | 7/2007 | Ording et al. | EP | 1457870 A2 | 9/2004 | |
| 2007/0152986 A1 | 7/2007 | Ogawa et al. | EP | 1471459 A2 | 10/2004 | |
| 2007/0165007 A1 | 7/2007 | Morrison et al. | EP | 1517228 A2 | 3/2005 | |
| 2007/0167709 A1 | 7/2007 | Slayton et al. | EP | 1550940 A2 | 6/2005 | |
| 2007/0205994 A1 | 9/2007 | van Ieperen | EP | 1611503 | 1/2006 | |
| 2007/0236454 A1 | 10/2007 | Ung et al. | EP | 1674977 | 6/2006 | |
| 2007/0269107 A1 | 11/2007 | Iwai et al. | EP | 1 297 488 B1 | 11/2006 | |
| 2007/0273842 A1 | 11/2007 | Morrison | EP | 1741186 | 1/2007 | |
| 2007/0290996 A1 | 12/2007 | Ting | EP | 1766501 | 3/2007 | |
| 2007/0291125 A1 | 12/2007 | Marquet | EP | 1830248 A1 | 9/2007 | |
| 2008/0029691 A1 | 2/2008 | Han | EP | 1877893 | 1/2008 | |
| 2008/0042999 A1 | 2/2008 | Martin | ES | 2279823 T3 | 9/2007 | |
| 2008/0055262 A1 | 3/2008 | Wu et al. | GB | 1575420 | 9/1980 | |
| 2008/0055267 A1 | 3/2008 | Wu et al. | GB | 2176282 A | 5/1986 | |
| 2008/0062140 A1 | 3/2008 | Hotelling et al. | GB | 2204126 A | 11/1988 | |
| 2008/0062149 A1 | 3/2008 | Baruk | GB | 2263765 A | 8/1993 | |
| 2008/0068352 A1 | 3/2008 | Worthington et al. | JP | 57-211637 A | 12/1982 | |
| 2008/0083602 A1 | 4/2008 | Auger et al. | JP | 61-196317 A | 8/1986 | |
| 2008/0106706 A1 | 5/2008 | Holmgren et al. | JP | 61-260322 A | 11/1986 | |
| 2008/0122803 A1 | 5/2008 | Izadi et al. | JP | 62-005428 | 1/1987 | |
| 2008/0129707 A1 | 6/2008 | Pryor | JP | 63-223819 | 9/1988 | |
| 2008/0259050 A1 | 10/2008 | Lin et al. | JP | 3-054618 A | 3/1991 | |
| 2008/0259052 A1 | 10/2008 | Lin et al. | JP | 03-244017 | 10/1991 | |
| 2009/0058832 A1 | 3/2009 | Newton | JP | 4-350715 A | 12/1992 | |
| 2009/0058833 A1 | 3/2009 | Newton | JP | 4-355815 A | 12/1992 | |
| 2009/0146972 A1 | 6/2009 | Morrison et al. | JP | 5-181605 A | 7/1993 | |
| | | | JP | 5-189137 A | 7/1993 | |
| FOREIGN PATENT DOCUMENTS | | | JP | 5-197810 A | 8/1993 | |
| AU | 2006243730 A1 | 11/2006 | JP | 06-110608 | 4/1994 | |
| CA | 2058219 A1 | 4/1993 | JP | 7-110733 A | 4/1995 | |

| | | | |
|---|---|---|---|
| JP | 7-230352 A | 8/1995 | |
| JP | 8-016931 B2 | 2/1996 | |
| JP | 8-108689 A | 4/1996 | |
| JP | 8-240407 A | 9/1996 | |
| JP | 8-315152 A | 11/1996 | |
| JP | 9-091094 A | 4/1997 | |
| JP | 9-224111 A | 8/1997 | |
| JP | 9-319501 A | 12/1997 | |
| JP | 10-105324 A | 4/1998 | |
| JP | 10-222646 A | 8/1998 | |
| JP | 11-051644 A | 2/1999 | |
| JP | 11-064026 A | 3/1999 | |
| JP | 11-085376 A | 3/1999 | |
| JP | 11-110116 A | 4/1999 | |
| JP | 11-203042 | 7/1999 | |
| JP | 11-212692 | 8/1999 | |
| JP | 2000-105671 A | 4/2000 | |
| JP | 2000-132340 A | 5/2000 | |
| JP | 2001-075735 A | 3/2001 | |
| JP | 2001-142642 | 5/2001 | |
| JP | 2001-282456 A | 10/2001 | |
| JP | 2001-282457 A | 10/2001 | |
| JP | 2002-055770 | 2/2002 | |
| JP | 2002-236547 A | 8/2002 | |
| JP | 2003-65716 A | 3/2003 | |
| JP | 2003-158597 A | 5/2003 | |
| JP | 2003-167669 A | 6/2003 | |
| JP | 2003-173237 A | 6/2003 | |
| JP | 2005-108211 A | 4/2005 | |
| JP | 2005-182423 A | 7/2005 | |
| JP | 2005-202950 A | 7/2005 | |
| WO | 96/27808 A2 | 9/1996 | |
| WO | 98/07112 A2 | 2/1998 | |
| WO | 99/08897 A1 | 2/1999 | |
| WO | 99/21122 A1 | 4/1999 | |
| WO | 99/28812 A1 | 6/1999 | |
| WO | 99/40562 A1 | 8/1999 | |
| WO | 01/24157 A1 | 4/2001 | |
| WO | 01/31570 A2 | 5/2001 | |
| WO | 01/63550 A2 | 8/2001 | |
| WO | 01/91043 A2 | 11/2001 | |
| WO | 02/03316 A1 | 1/2002 | |
| WO | 02/07073 A2 | 1/2002 | |
| WO | 02/27461 A1 | 4/2002 | |
| WO | 03/104887 A2 | 12/2003 | |
| WO | 03/105074 A2 | 12/2003 | |
| WO | 2004/072843 A1 | 8/2004 | |
| WO | 2004/090706 A2 | 10/2004 | |
| WO | 2004/102523 A1 | 11/2004 | |
| WO | 2004/104810 A1 | 12/2004 | |
| WO | 2005/031554 A1 | 4/2005 | |
| WO | 2005034027 A1 | 4/2005 | |
| WO | WO 2005/034027 A1 | 4/2005 | |
| WO | 2005/106775 A1 | 11/2005 | |
| WO | 2005/107072 A1 | 11/2005 | |
| WO | 2006/002544 A1 | 1/2006 | |
| WO | 2006/020462 A2 | 2/2006 | |
| WO | 2006/092058 A1 | 9/2006 | |
| WO | 2006/095320 A2 | 9/2006 | |
| WO | 2006/096962 A1 | 9/2006 | |
| WO | WO 2006/095320 A2 | 9/2006 | |
| WO | 2006/116869 A1 | 11/2006 | |
| WO | 2007/003196 A2 | 1/2007 | |
| WO | 2007/019600 A1 | 2/2007 | |
| WO | 2007/037809 | 4/2007 | |
| WO | 2007/064804 A1 | 6/2007 | |
| WO | 2007/079590 | 7/2007 | |
| WO | 2007/132033 A1 | 11/2007 | |
| WO | 2007/134456 A1 | 11/2007 | |
| WO | 2008/128096 A2 | 10/2008 | |
| WO | 2009/029764 A1 | 3/2009 | |
| WO | 2009/029767 A1 | 3/2009 | |
| WO | 2009/146544 A1 | 12/2009 | |
| WO | WO 2009/146544 A1 | 12/2009 | |
| WO | 2010/051633 A1 | 5/2010 | |

OTHER PUBLICATIONS

International Search Report for PCT/CA2008/001350 mailed Oct. 17, 2008 (5 Pages).
International Search Report and Written Opinion for PCT/CA2007/002184 mailed Mar. 13, 2008 (13 Pages).
International Search Report and Written Opinion for PCT/CA2004/001759 mailed Feb. 21, 2005 (7 Pages).
International Search Report for PCT/CA01/00980 mailed Oct. 22, 2001 (3 Pages).
International Search Report and Written Opinion for PCT/CA2009/000773 mailed Aug. 12, 2009 (11 Pages).
European Search Opinion for EP 07 25 0888 dated Jun. 22, 2007 (2 pages).
European Search Report for EP 07 25 0888 dated Jun. 22, 2007 (2 pages).
European Search Report for EP 06 01 9269 dated Nov. 9, 2006 (4 pages).
European Search Report for EP 06 01 9268 dated Nov. 9, 2006 (4 pages).
European Search Report for EP 04 25 1392 dated Jan. 11, 2007 (2 pages).
European Search Report for EP 02 25 3594 dated Dec. 14, 2005 (3 pages).
Partial European Search Report for EP 03 25 7166 dated May 19, 2006 (4 pages).
May 12, 2009 Office Action for Canadian Patent Application No. 2,412,878 (4 pages).
Förstner, Wolfgang, "On Estimating Rotations", Festschrift für Prof. Dr.—Ing. Heinrich Ebner Zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).
Funk, Bud K., CCD's in optical panels deliver high resolution, Electronic Design, Sep. 27, 1980, pp. 139-143.
Hartley, R. and Zisserman, A., "Multiple View Geometry in Computer Vision", Cambridge University Press, First published 2000, Reprinted (with corrections) 2001, pp. 70-73, 92-93, and 98-99.
Kanatani, K., "Camera Calibration", Geometric Computation for Machine Vision, Oxford Engineering Science Series, vol. 37, 1993, pp. 56-63.
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.
Wang, F., et al., "Stereo camera calibration without absolute world coordinate information", SPIE, vol. 2620, pp. 655-662, Jun. 14, 1995.
Wrobel, B., "minimum Solutions for Orientation", Calibration and Orientation of Cameras in Computer Vision, Springer Series in Information Sciences, vol. 34, 2001, pp. 28-33.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).

*Touch Panel*, vol. 3 No. 7-8 (2009).
*Touch Panel*, vol. 3 No. 9 (2009).
*Touch Panel*, vol. 4 No. 2-3 (2009).
Jul. 5, 2010 Office Action, with English translation, for Japanese Patent Application No. 2005-000268 (6 pages).
Villamor et al. "Touch Gesture Reference Guide", Apr. 15, 2010.
Touch Panel, vol. 5 No. 2-3 (Sep. 2010).
Touch Panel, vol. 5 No. 4 (Nov. 2010).
International Search Report and Written Opinion for PCT/CA2010/001085 mailed Oct. 12, 2010.
English Translation of Decision of Rejection for Japanese Patent Application No. 2002-507309, date of Decision: Aug. 18, 2011, 9 pages.
International Preliminary Report on Patentability, PCT/NZ2004/000029, May 20, 2005 (21 pages).
"International Preliminary Report on Patentability", PCT/US2008/060102, Oct. 22, 2009 (9 pages).
International Search Report for PCT/CA2010/001085 mailed Oct. 12, 2010 (5 pages).
"International Application Serial No. PCT/US2008/060102, Search Report & Written opinion mailed Feb. 12, 2009" (14 pages).
International Application Serial No. PCT/US2008/074749, Search Report & Written Opinion mailed Feb. 11, 2009 (10 pages).
"International Application Serial No. PCT/US2008/074755, International Search Report and Written Opinion mailed Jan. 29, 2009" (14 pages).
International Search Report for PCT/NZ05/00092 Sep. 27, 2006 (4 pages).
Loinaz et al., "A 200-mW, 3.3-V, CMOS Color Camera IC Producing 352x288 24-B Video at 30 Frames/s," IEEE Journal of Solid-StateCircuits,vol. 31,No. 12,Dec. 1998, pp. 2092-2103.
Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip for Multimedia Applications, Photobit Corporation, 1999 (2 pages).
Transmittal; Written Opinion of the International Searching Authority; and the International Search Report for International Application No. PCT/CA2009/001595, Sep. 12, 1996.

\* cited by examiner

INTERACTIVE INPUT SYSTEM WITH MULTI-ANGLE REFLECTOR

FIELD OF THE INVENTION

The present invention relates generally to interactive input systems, and in particular, to an interactive input system comprising a multi-angle reflector.

BACKGROUND OF THE INVENTION

Interactive input systems that allow users to inject input (eg. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); touch-enabled laptop PCs; personal digital assistants (PDAs); and other similar devices.

PCT Application Publication No. WO 02/03316 to Morrison et al., assigned to the assignee of the present application, the contents of which are incorporated by reference, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look across the touch surface. The digital cameras acquire images looking across the touch surface from different locations and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or drawing or used to control execution of applications programs executed by the computer.

The touch system described above has been shown to work extremely well. However, due to employing two or four digital cameras and associated digital signal processors, the touch system described above is somewhat expensive to produce.

Camera-based touch systems having fewer hardware components have been considered. For example, U.S. Pat. No. 5,484,966 to Segen discloses an apparatus for determining the location of an object within a generally rectangular active area. The apparatus includes a pair of mirrors extending along different sides of the active area and oriented so that the planes of the mirrors are substantially perpendicular to the plane of the active area. The mirrors are arranged at a 90 degree angle with respect to one another and intersect at a corner of the active area that is diametrically opposite a detecting device. The detecting device includes a mirror and a CCD sensor and looks along the plane of the active area. A processor communicates with the detecting device and receives image data from the CCD sensor.

According to Segen, when a stylus is placed in the active area, the detecting device sees the stylus directly as well as images of the stylus reflected by the mirrors. Images including the stylus and stylus reflections are captured by the detecting device and the captured images are processed by the processor to detect the stylus and stylus reflections in the captured images. With the stylus and stylus reflections having been determined, the location of the stylus within the active area is calculated using triangulation.

Although the camera-based touch system described above employs only one optical sensing device and processor, a reflective bezel is required along multiple sides of the active area, which can be obstructive to users.

It is therefore an object of the present invention to provide a novel interactive input system comprising a multi-angle reflector along a single side of the pointer input region.

SUMMARY OF THE INVENTION

Accordingly, in one aspect there is provided an interactive input system, comprising:

a pointer input region;

a multi-angle reflecting structure located along a single side of the pointer input region and operable to reflect radiation from a pointer within the pointer input region from at least two surface locations of the multi-angle reflecting structure, wherein the at least two surface locations each have different respective angles;

an imaging system operable to capture within at least a portion of the pointer input region images of the reflected radiation located within a field of view of the imaging system; and processing structure for determining the location of the pointer relative to the pointer input region based on the at least one image.

In another aspect there is provided, in an interactive input system, a method of detecting the position of a pointer associated with a pointer input region, the method comprising:

illuminating the pointer when applied to the pointer input region;

reflecting along a single side of the pointer input region a first incident radiation signal received from the illuminated pointer;

reflecting along the single side of the pointer input region a second incident radiation signal received from the illuminated pointer;

acquiring an image of the reflected first and second incident radiation signals; and processing the acquired image to determine the position of the pointer relative to the pointer input region using triangulation.

In another aspect there is provided an interactive input system, comprising:

a pointer input region;

a multi-angle reflector located along a single side of the pointer input region and operable to reflect radiation received from an object associated with the pointer input region from at least two non-planar surfaces of the multi-angle reflector; and an imaging system operable to capture within at least a portion of the pointer input region images of the reflected radiation located within a field of view of the imaging system for determining the location of the object relative to the pointer input region.

In another aspect there is provided an interactive input system, comprising:

a pointer input region;

a plurality of reflectors located along a single side of the pointer input region and operable to reflect radiation received from an object associated with the pointer input region from each of the plurality of reflectors, wherein each of the plurality of reflectors comprise a different shape; and an imaging system operable to capture within at least a portion of the pointer input region images of the reflected radiation located within a field of view of the imaging system for determining the location of the object relative to the pointer input region.

In another aspect there is provided an interactive input system, comprising:

a pointer input region;

a plurality of reflectors located along a single side of the pointer input region and operable to reflect radiation received from an object associated with the pointer input region from each of the plurality of reflectors, wherein each of the plurality of reflectors comprise a different angular orientation; and an imaging system operable to capture within at least a portion of the pointer input region images of the reflected radiation located within a field of view of the imaging system for determining the location of the object relative to the pointer input region.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
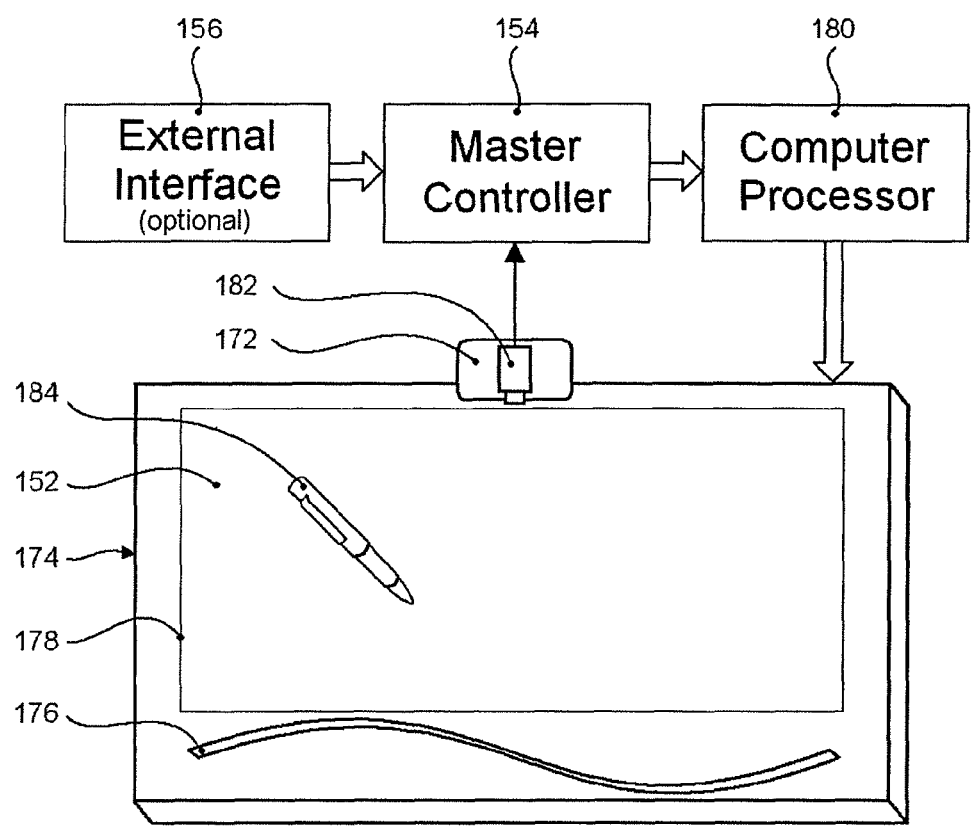
FIG. 1 is a schematic diagram of an interactive input system.

Turning now to FIG. 1, a schematic diagram of an interactive input system in the form of a touch system is shown and generally identified by reference numeral 150. Touch system 150 comprises a pointer input region 178 (or interactive region, touch area, etc) on a touch surface 152 of a display screen 174, a multi-angle reflector 176, an imaging system 172, a master controller 154, and a processing structure 180, and an external interface 156.

The display screen 174, in this embodiment an LCD monitor, presents images provided by the processing structure 180 executing one or more application programs. The an external interface 156 provides the means by which images may be provided to other systems for various purposes, such as web conferencing.

The multi-angle reflector 176, in this embodiment a reflective compound curve shaped bezel, similar in appearance to a sinusoid, is positioned along a first side of the pointer input region 178 and across the pointer input region 178 from imaging system 172. The reflective surface of the multi-angle reflector 176 faces the imaging system 172, and extends a short distance approximately vertical from the plane of the pointer input region 178.

The imaging system 172 is positioned along a second side of the pointer input region 178 with a field of view capable of observing the multi-angle reflector 176 and generally looking across the pointer input region 178 from the multi-angle reflector 176 and is aimed at the multi-angle reflector 176.

Figure 2:
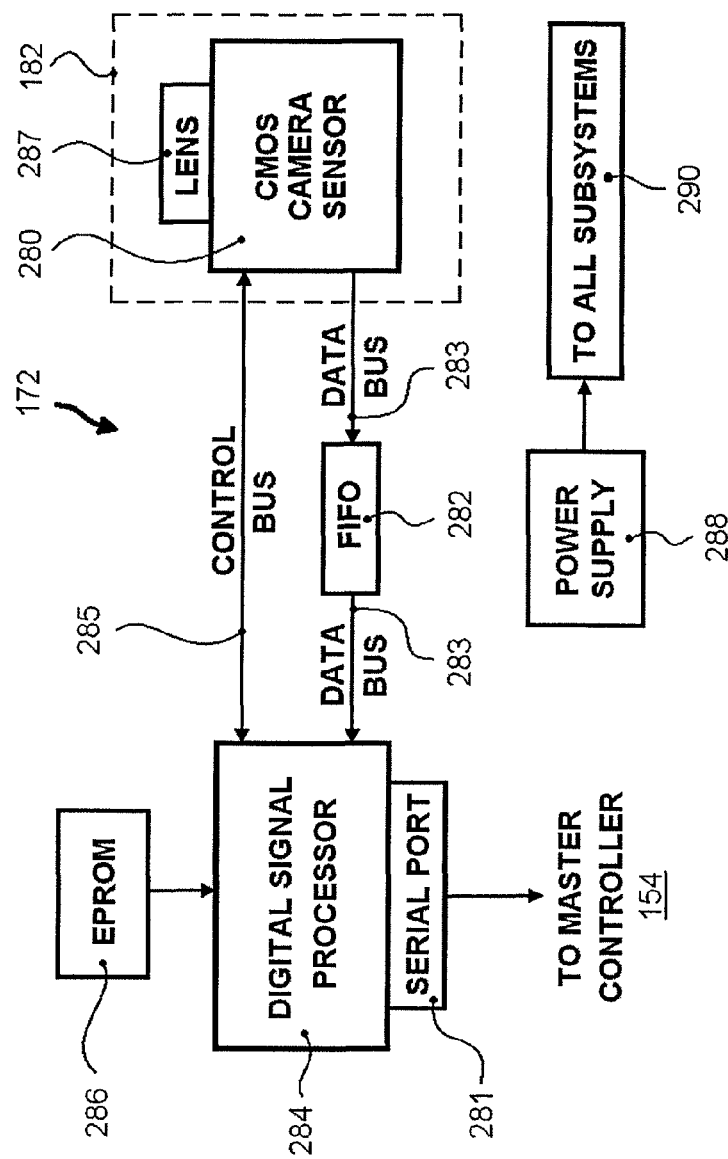
FIG. 2 is a schematic diagram of an imaging assembly for the interactive input system.

FIG. 2 is a schematic diagram showing the imaging system 172 in further detail. Imaging system 172 comprises a digital camera 182 having a lens 287 and an image sensor 280 (eg. CMOS, CCD, etc). Image data captured by the digital camera 182 enters a First-In First-Out (FIFO) buffer 282 via a data bus 283. A digital signal processor (DSP) 284 receives the image data from the FIFO buffer 282 via a second data bus 283 and provides image data to the master controller 154 via a serial input/output port 281. The camera 182 and DSP 284 provide respective control signals to each other via a control bus 285. An Electronically Programmable Read Only Memory (EPROM) 286 associated with DSP 284 stores system parameters such as calibration data. All subsystems of the imaging system 172 receive power from a power supply 288.

Figure 3:
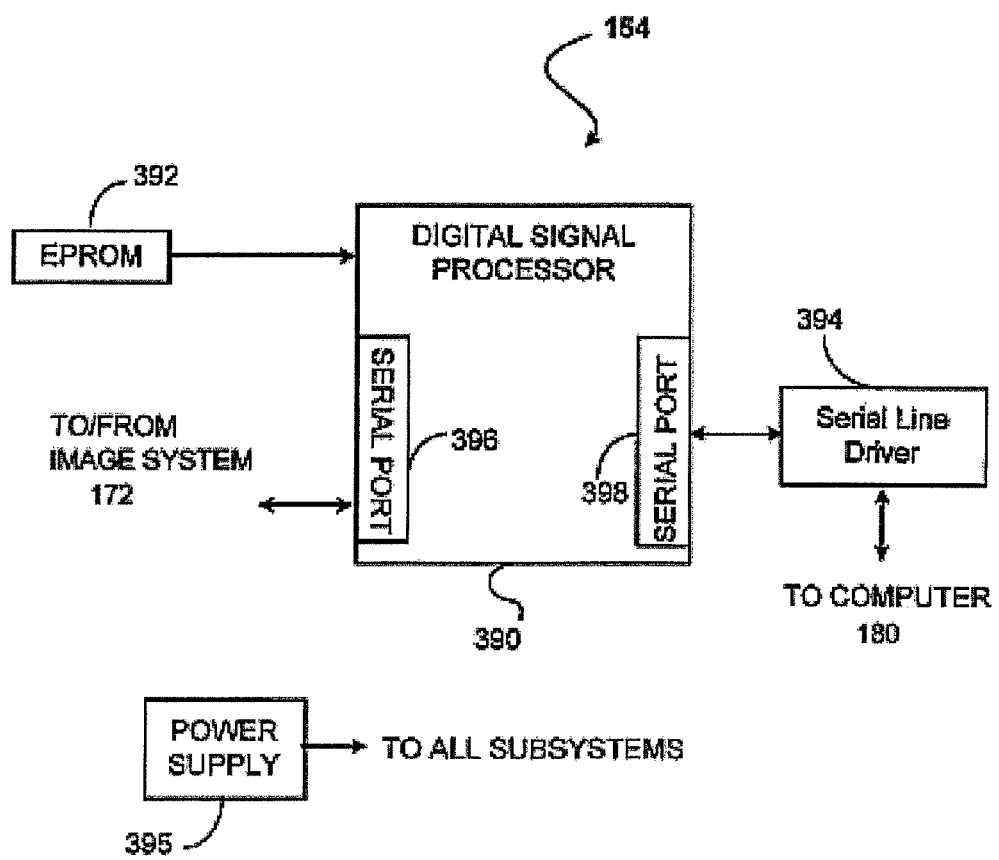
FIG. 3 is a schematic diagram of a master controller for the interactive input system.

FIG. 3 is a schematic diagram showing the master controller 154 in further detail. Master controller 154 may also comprise a DSP 390 having a first serial input/output port 396 and a second serial input/output port 398. The master controller 154 communicates with imaging system 172 via first serial input/output port 396 to provide control signals and to receive digital image data. Received digital image data is processed by DSP 390 to generate pointer location data as will be described, which is sent to the processing structure 180 via the second serial input/output port 398 and a serial line driver 394. Control data is also received by DSP 390 from processing structure 180 via the serial line driver 394 and the second serial input/output port 398. Master controller 154 further comprises an EPROM 392 that stores system parameters. Master controller 154 receives power from a power supply 395.

The processing structure 180 in this embodiment is a general purpose computing device in the form of a computer. The computer (not shown) comprises, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computer components to the processing unit. The computer can include a network connection to access shared or remote drives, one or more networked computers, or other networked devices.

During operation of the touch system 150, processing structure 180 outputs video data to display screen 174. A pointer placed in the pointer input region 178 of touch surface 152 emits incident radiation towards the multi-angle reflector 176. Multi-angle reflector 176 reflects the incident radiation from two (2) of its surface locations towards the imaging system 172. The imaging system 172 receives images of the multi-angle reflector 176 including the reflected radiation, and provides the images to master controller 154. Master controller 154 processes the images to generate pointer location data based on the location of the reflected radiation in the images, and the pointer location data is then provided to processing structure 180. The processing structure 180 uses the pointer location data to update the video images being output to display screen 174 for presentation and interaction with applications. Pointer contacts in the pointer input region 178 of the touch surface 152 on the display screen 174 can therefore be recorded as writing or drawing or used to control execution of applications programs executed by the processing structure 180.

The multi-angle reflector 176 is constructed according to a numerical optimization based on design constraints, so that at least two reflections of the pointer 184 in the entire pointer input region 152 are visible to the imaging system 172. In this embodiment, the multi-angle reflector 176 comprises both a section having a convex shape and a section having a concave shape. Each section is a rectangular strip from the surface of a torus. The optimization itself is developed on the two dimensional plane parallel to the pointer input region, where each part of the multi-angle reflector 176 is projected as a portion of a circle. The goal of optimization is to determine the parameters of each portion of the circles, including the radius of each circle, the location of the center of each circle, and the start and end angles of each portion of the circle. Optimization of these parameters is performed under a number of constraints. For example, the two portions of the circles are conjugated by the first derivative. In other words, for reflector continuity, the first derivative of the ending point of the first circle must equal that of the ending point of the second circle. Also, the two portions of the circles are conjugated at a predetermined location, and are within the camera's field of view (FOV). The radius of each piece of circle is no larger than a first upper limit, and the height of the multi-angle reflector (i.e. the conjugated circles portions) is no larger than a second upper limit. The goal here is to achieve, for any point in the pointer input region, at least two different light rays to the imaging system after reflection by the multi-angle reflector.

The optimization is developed numerically with the assistance of optimization software such as for example Matlab™ or Zemax™. Those skilled in the art will appreciate that other types of curvatures may also be used for designing the multi-angle reflector 176, other appropriate optimization parameters and constraints can also be employed, and other appropriate optimization techniques and software can be used for the optimization.

Figure 4A:
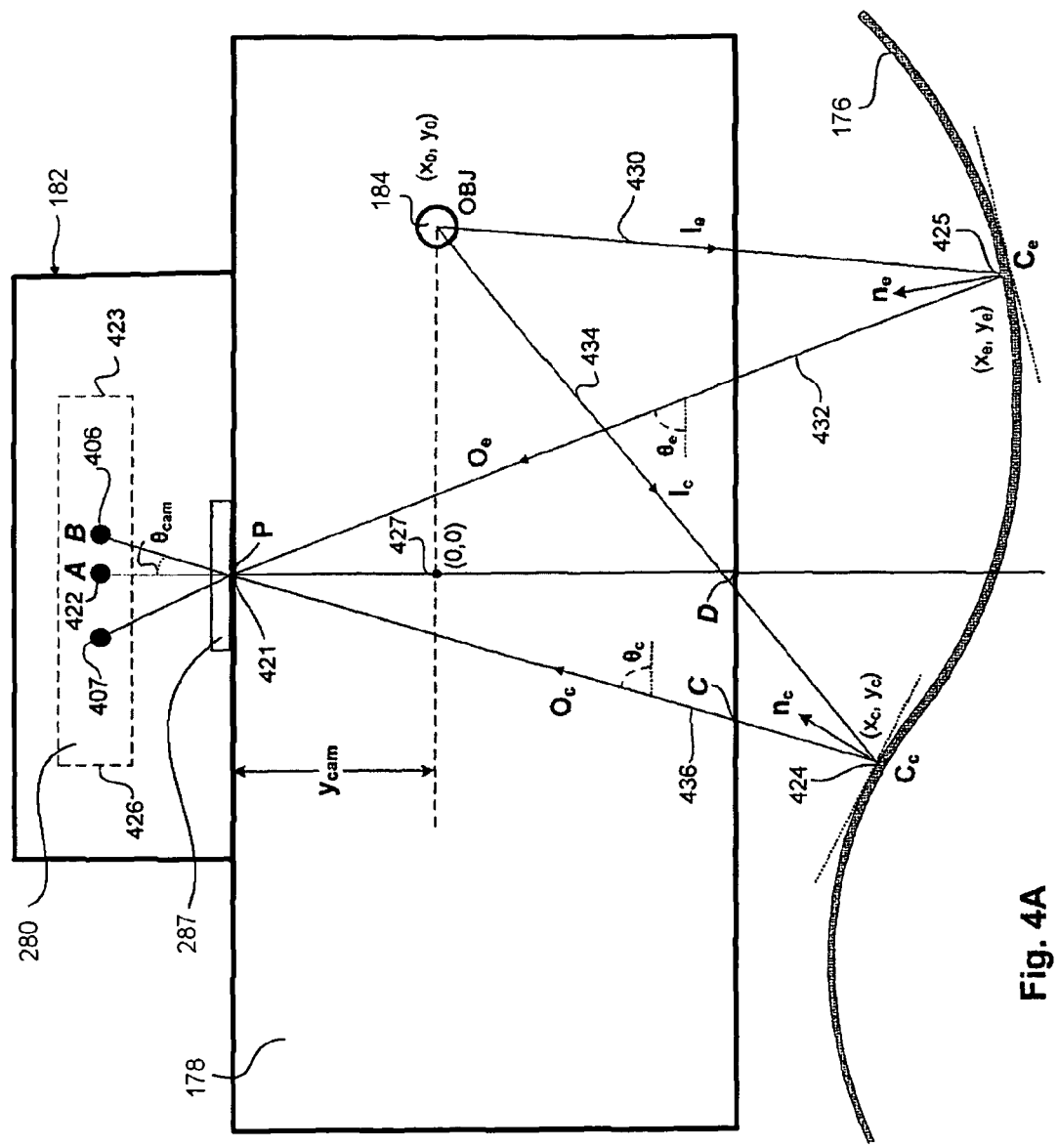
FIG. 4A is a plan view showing reflections of radiation from a multi-angle reflector across a pointer input region of the interactive input system.

FIG. 4A is a plan view showing two example rays of reflected radiation from surface locations on the multi-angle reflector 176, across the pointer input region 178, to the camera 182 of the imaging system 172. Other rays (not shown) are reflected off of the multi-angle reflector 176 but may not be reflected to the imaging system 182. The source of the radiation is an illuminated pointer 184, in this embodiment an active pointer with a powered light emitting diode (LED). Pointer 184 is positioned in the pointer input region 178 at location $(x_0, y_0)$ in a reference coordinate system with an origin (0,0) at location 427.

Incident ray 430 of radiation, denoted as vector $\hat{I}_e$, is emitted by the pointer 184 and reaches a reflective surface location 425, denoted as $(x_e, y_e)$, on a concave portion of the multi-angle reflector 176. The reflected ray 432, denoted as vector $\vec{O}_e$, leaves the surface location 425 at a reflection angle in accordance with the law of reflection, as described below.

Similarly, incident ray 434, denoted as vector $\hat{I}_c$, is emitted by the pointer 184 and is reflected from a surface location 424, denoted as $(x_c, y_c)$, on a convex portion of the multi-angle reflector 176. The reflected radiation ray 436, denoted as vector $\vec{O}_e$, leaves from surface location 424 at a reflection angle according to the law of reflection.

Figure 4B:
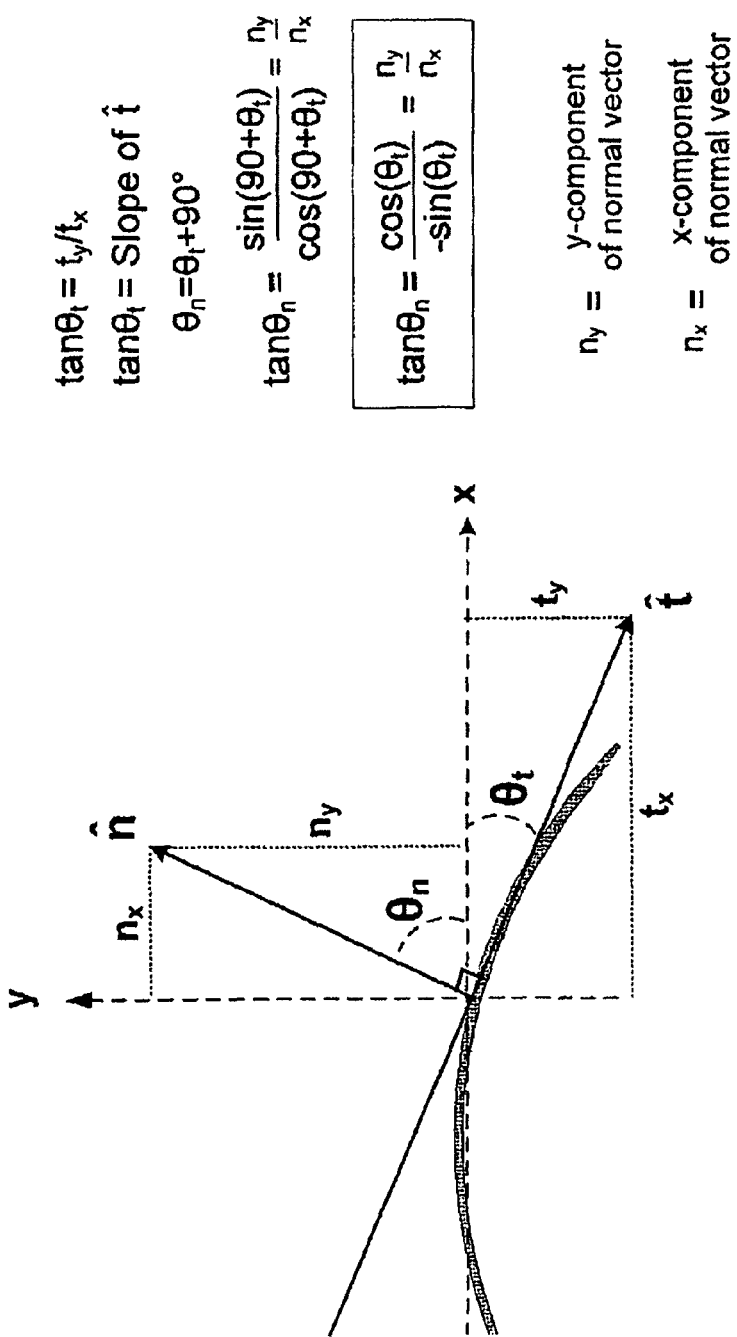
FIG. 4B is a plan view showing in isolation a convex portion of the multi-angle reflector of FIG. 4A and the normal vector at a location on the convex portion.

According to the law of reflection, the angle of incidence of a ray with respect to a surface normal is equal to the angle of reflection of the ray. FIG. 4B illustrates that the surface normal vector $\hat{n}$ at a location on the surface of a convex portion of the multi-angle reflector 176 is perpendicular to the tangent $\hat{t}$ to the surface at that location. The tangent $\hat{t}$ can be approximated over small distances by using the slope of a chord passing through two nearby surface locations centered at the surface location of interest. Other known methods of approximating the tangent may be employed.

Figure 4C:
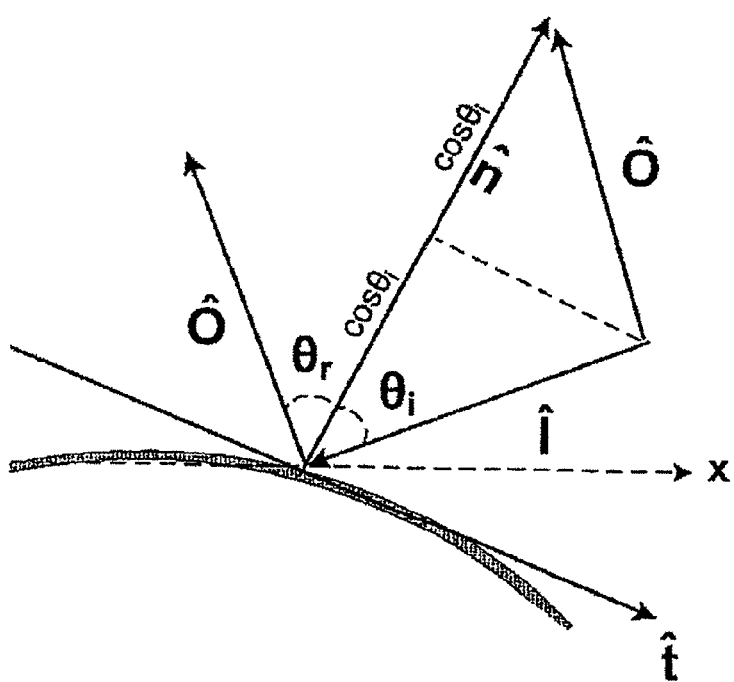
FIG. 4C is a diagram showing in isolation the convex portion of the multi-angle reflector of FIG. 4A, and the reflection from a location on the convex portion of a ray of radiation from a pointer in the pointer input region.

FIG. 4C illustrates that a reflected ray vector Ô may be calculated based on the angle of incidence $\theta_i$ of an incident ray Î to a surface location and the normal n̂ at that surface location, as shown in Equations 1 through 4, below:

$$\hat{O} = \hat{I} + (2\cos\theta_i)\hat{n} \quad (1)$$

$$\hat{O} = \hat{I} - 2\langle \hat{I}, \hat{n}\rangle \hat{n} \quad (2)$$

$$\langle \hat{I}, \hat{n}\rangle \hat{I} \bullet \hat{n} = \|\hat{I}\|\|\hat{n}\|(-\cos\theta_i) \quad (3)$$

$$\|\hat{I}\|\|\hat{n}\| = 1 \quad (4)$$

Returning to FIG. 4A, the reflected radiation rays 432 and 436 pass through a camera entrance pupil 421 and the lens 287 of camera 182 and reach image sensor 280 at sensor locations 407 and 406, respectively. It will be understood that other reflected radiation rays (not shown) having left respective surface locations will not reach the camera entrance pupil 421 due to their respective angles of reflection.

For positions at which the camera 182 is able to observe the pointer 184 directly, the image of the pointer 184 can be used in the calculation to triangulate the position or the pointer 184 can be ignored. Using the image of the pointer 184 in the triangulation calculation is more robust as it compensates for instances where the pointer 184 obscures one of the images of the reflections 424 or 425. The pointer 184 in the image may appear larger than its reflections due to the proximity of the pointer 184 to the imaging system 172. Further, the pointer 184 may appear brighter in the image than its reflections due to the attenuation of the multi-angle reflectors. Preferably, the size of the bright spots in the image are compared to determine which is the largest and therefore coming directly from the pointer and not having been reflected by the reflecting structure. However, another method by which the bright spots due to the reflection are determined is by defining a line between the calculated position of each pair of bright spots detected (as set out below) and seeing if the third bright spot (eg. not in the tested pair) falls on the line. If the third bright spot falls on this line, then the pair of bright spots is the reflected ones. Otherwise, another of the pairs is the reflected bright spots Image sensor 280 produces images of the multi-angle reflector 176. When pointer 184 is in the pointer input region, the produced images include two bright points/areas at locations 407 and 406. The images are provided to the master controller 154, which calculates the coordinates $(x_0, y_0)$ of the pointer 184 based on the locations in the images of the bright spots at locations 407 and 406 and known parameters respecting the positions in the reference coordinate system of the camera entrance pupil 421, the image sensor 280, and the multi-angle reflector 176.

Figure 5:
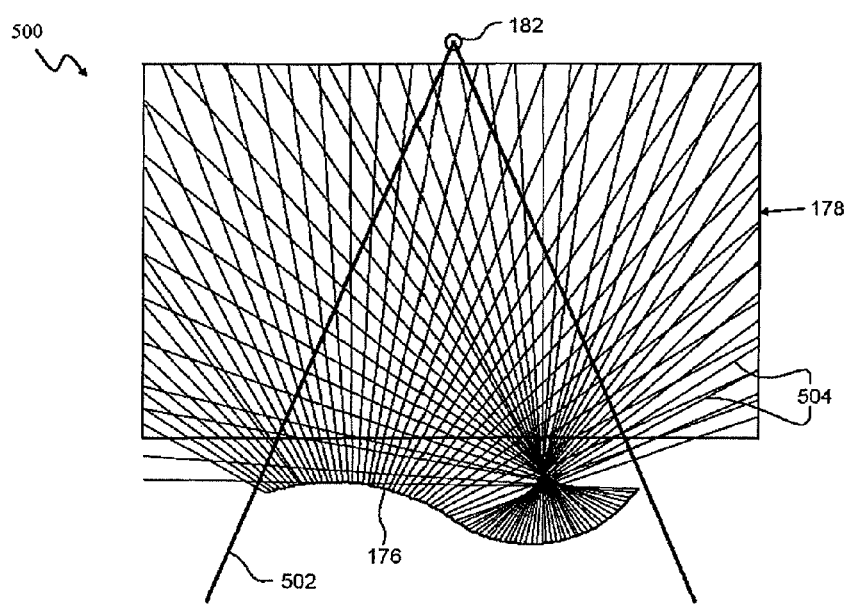
FIG. 5 is a front view of an interactive system with one multi-angle reflector demonstrating touch resolution.

The field of view 502 of the digital camera 182 is demonstrated in FIG. 5. The field of view 502 should encompass the multi-angle reflector 176 of the interactive surface 178. The reflection rays 504 extending off of the multi-angle reflector 176 generally indicate the touch resolution of the surface for this embodiment. Generally, the further from the multi-angle reflector that the pointer 184 is, the more decreased the triangulation resolution. To partially compensate for the lower touch resolution at the top of the interactive surface 178, the image of the pointer 184 can be incorporated into the triangulation calculation thus improving the touch resolution within the field of view 502. The increased resolution within the field of view allows more refined motion (such as handwriting) in this area. Touch interaction outside of this area would have lower resolution and would therefore me more suited to coarser actions such as interacting with buttons on the pointer input region.

Figure 6:
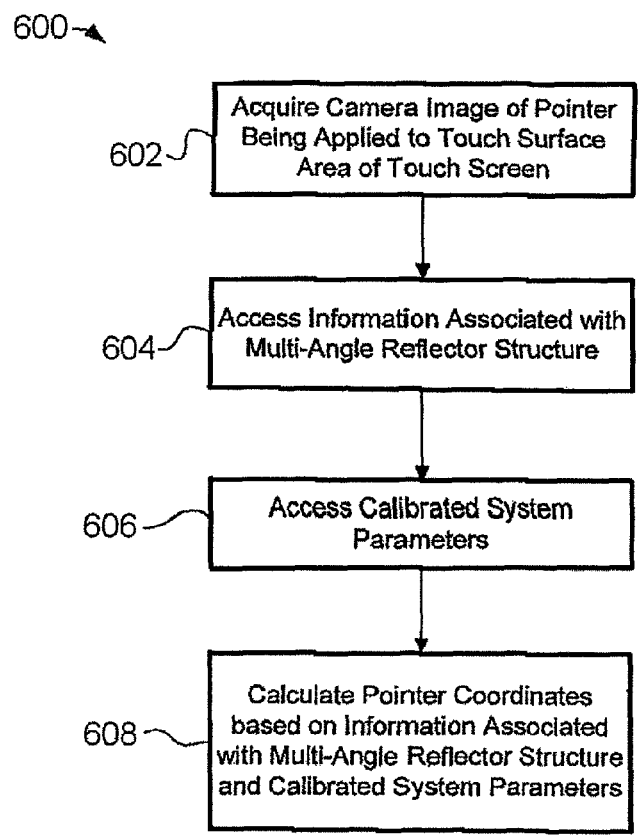
FIG. 6 is a flow chart showing steps in a method for determining the location of a pointer in a pointer input region of the interactive input system.
Figure 7A:
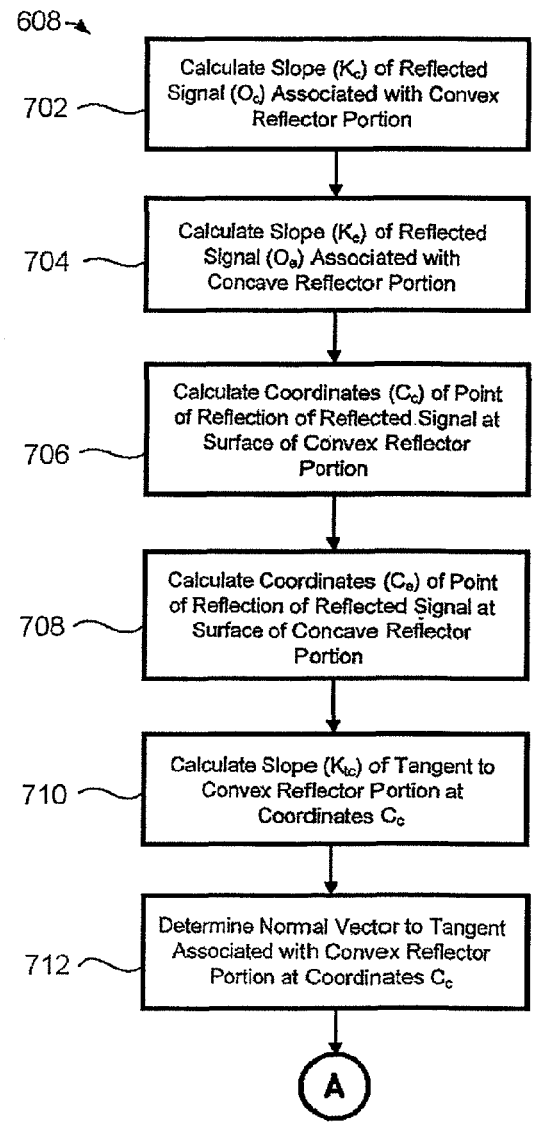
FIGS. 7A to 7D show a flow chart showing in further detail steps for calculating pointer coordinates during the method shown in FIG. 6.
Figure 7B:
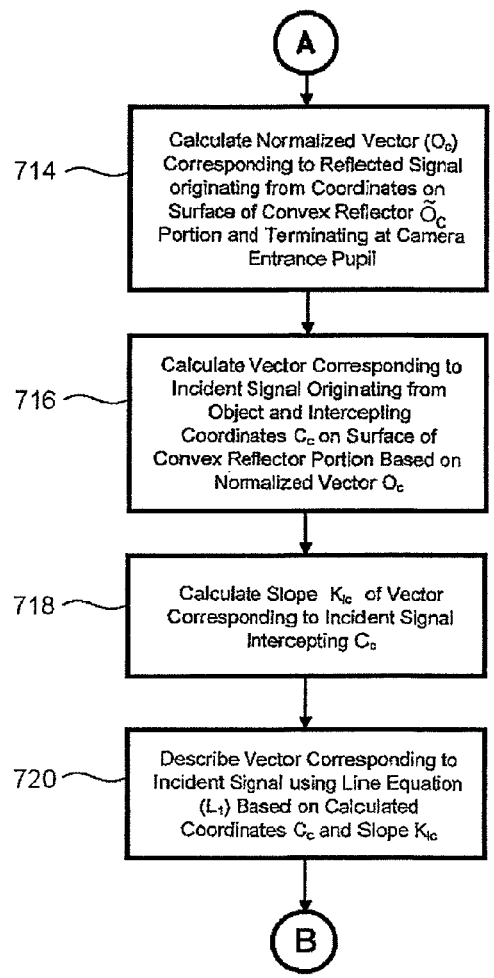
Figure 7C:
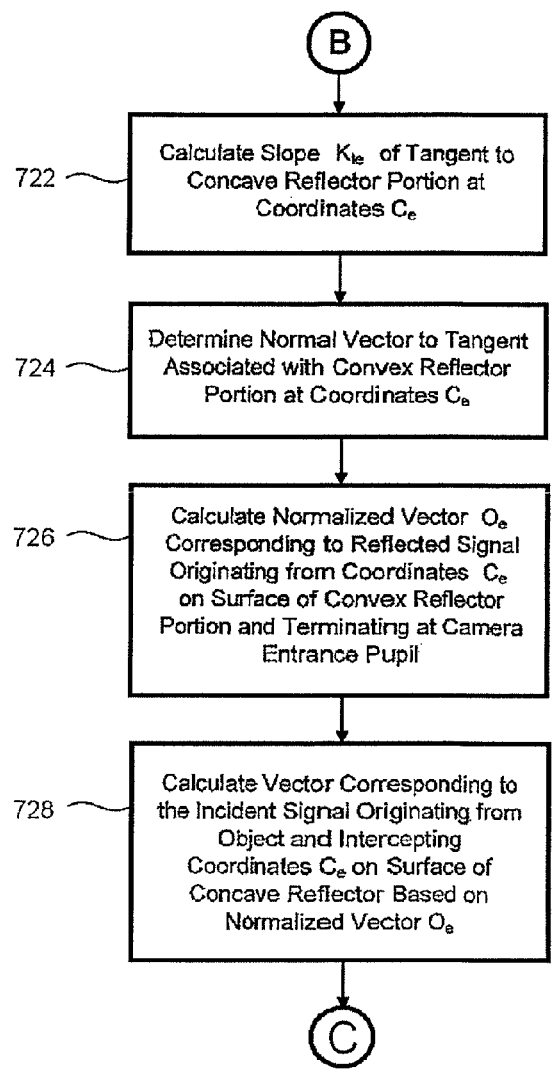
Figure 7D:
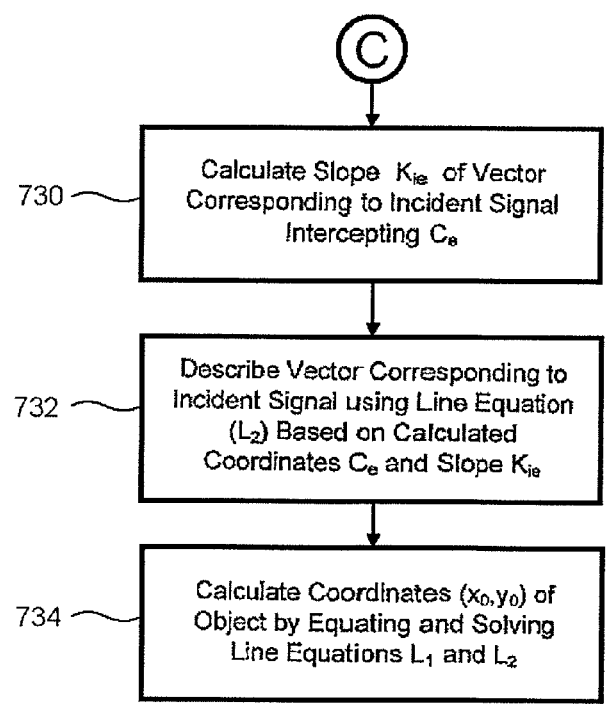

FIG. 6 shows a flow chart of a method for generating the pointer location data. First, a camera image of the multi-angle reflector 176, including any bright points 407, 406 due to the reflected light rays 432 and 436 of a pointer having been applied to the pointer input region 178 is acquired by the imaging system 172 (step 602). Predefined or calibrated parameters describing the multi-angle reflector 176, including the multi-angle reflector 176 profile (eg. coordinates of each point along the surface of the multi-angle reflector) is then retrieved (step 604). Predefined system parameters determined by calibration, such as offsets of the camera entrance pupil dx and dy from the point $(0, y_{cam})$ defined with respect to the coordinate reference of the touch system are retrieved. Additional parameters, including imaging system parameters such as the principle point, the number of degrees per pixel dp in the camera image, and the y-coordinate $y_{cam}$ of the camera entrance pupil 421, parameters describing the variance between the imaging system 172 and an ideal pinhole camera, are also retrieved (step 606), which are then compensated by the calibrated parameters. Typically, these parameters are retrieved from non-volatile memory in the master controller 154. With the camera image having been acquired and the various parameters having been retrieved, the pointer location data is calculated (step 608). Typically, these parameters are retrieved from non-volatile memory in master controller 154.

FIGS. 7A to 7D show in further detail steps for calculating the pointer location data (step 608), and in particular for calculating the coordinates $(x_0, y_0)$ of the pointer 184 with respect to the reference coordinate system. Here, we assume that system parameters have been compensated by calibrated parameters such that the camera entrance pupil 421 is at the coordinate location $(0, y_{cam})$.

The slope $k_c$ of the ray $\vec{O}_c$ reflected from surface location 424 on the convex portion of the multi-angle reflector 176 to the camera entrance pupil 421 is first calculated (step 702), as shown in Equation 5 below:

$$k_c = \tan(-(pc - u0)*dp + 90) \quad (5)$$

where:
  pc=distance in pixels of bright point 406 from the camera image edge 426;
  u0=distance in pixels of principle point 422 from the camera image edge 426; and
  dp=the number of degrees per pixel in the camera image.

The slope $k_e$ of the ray $\vec{O}_e$ reflected from surface location 425 on the concave portion of the multi-angle reflector 176 to the camera entrance pupil 421 is then calculated in a similar manner (step 704), as shown in Equation 6, below:

$$k_e = \tan(-(pe - u0)*dp + 90) \quad (6)$$

where:
  pe=distance in pixels of bright point 407 from the camera image edge 426.

Based on the calculated slope $k_c$ and known coordinates $(0, y_{cam})$ of the camera entrance pupil 421, the equation of the reflected ray $\vec{O}_c$ is determined as $$y = k_c x + y_{cam} \quad (7).$$

The x-coordinate $(x_c, y_c)$ of the intersection point 424 of the reflected ray $\vec{O}_c$ with the surface of the multi-angle reflector 176 is then determined by using the equation of the reflected ray $\vec{O}_c$ and the predefined surface coordinate data of the multi-angle reflector 176 stored in the lookup table. Many methods can be used. For example, linear search methods may be used to find $(x_c, y_c)$, with which at least a subset of the predefined surface coordinate data of the multi-angle reflector 176 stored in the lookup table are used, where the subset of coordinates may be determined by using, e.g., the Newton's method. For each pair of coordinates $(x_i, y_i)$ in the selected subset, one substitutes $x_i$ into Equation 7 to calculate the corresponding y-coordinate $\bar{y}_i$, and then calculates the squared error $|y_i - \bar{y}_i|^2$. The pair of coordinates that leads to minimum squared error is used as $(x_c, y_c)$. Those skilled in the art will appreciate that other optimization methods for finding $(x_c, y_c)$ may also be used.

The point can be determined by checking each of the pairs of coordinates describing the multi-angle reflector surface in the look up table to see which pair of coordinates fits the line equation of the reflected ray. i.e. A y-coordinate on the reflected ray can be calculated for each x-coordinate in the look up table and the calculated y-coordinates can be compared with the y-coordinates in the look up table. When the calculated y-coordinate on the reflected ray matches the y-coordinate in the look up table, the reflection point has been found. Various methods could be used to increase the speed of the search. For example, a coarse search could be performed on a subset of the coordinates initially to identify the region of the reflector where the intersection point falls, and a finer search could then be used to determine the exact intersection point.

In a similar manner, based on the calculated slope $k_e$ and the known coordinates $(0, y_{cam})$ of the camera entrance pupil 421, the equation of the reflected ray $\vec{O}_e$ is determined. The coordinates $(x_e, y_e)$ of the intersection point 425 of the reflected ray $\vec{O}_e$ with the surface of the multi-angle reflector 176 is then determined by using the equation of the reflected ray $\vec{O}_e$ and the predefined surface coordinate data of the multi-angle reflector 176 stored in the lookup table (step 708).

With the coordinates $(x_c, y_c)$ of surface location 424 having been determined, the slope $K_{tc}$ of a tangent to the convex portion of the surface of the multi-angle reflector 176 at coordinates $(x_c, y_c)$ of surface location 424 is calculated (step 710). More particularly, the slope $K_{tc}$ is calculated as the slope of a line connecting two nearby surface locations (selected from the lookup table) centered at coordinates $(x_c, y_c)$ of surface location 424.

With the slope $K_{tc}$ of the tangent at surface location 424 having been calculated, the normal $\hat{n}_c$ at surface location 424 is then calculated (step 712) as shown in Equation 8 below:

$$\hat{n}_c = (-\sin(alc), \cos(alc)) \tag{8}$$

where:
  $alc = \operatorname{atan}(K_{tc})$.

The normalized form $\hat{O}_c$ of vector $\vec{O}_c$ representing the ray from surface location 424 to camera entrance pupil 421 is then calculated (step 714), as shown in Equation 9 below:

$$\hat{O}_c = \vec{O}_c / \|\vec{O}_c\| \tag{9}$$

where:
  $\vec{O}_c = (-x_c, y_{cam} - y_c)$; and
  $y_{cam}$ = the y-coordinate of the camera entrance pupil relative to reference point 427.

Based on the law of reflection described above with reference to FIG. 4C, vector $\hat{I}_c$ representing the incident ray from the pointer 184 to the surface location 424 is calculated (step 616), as shown in Equation 10 below:

$$\hat{I}_c = \hat{O}_c - 2\langle \hat{O}_c, \hat{n}_c \rangle \hat{n}_c \tag{10}$$

where:
  $\langle \hat{O}_c, \hat{n}_c \rangle$ denotes a dot product.

The slope $K_{ic}$ of vector $\hat{I}_c$ is then calculated (step 718), as shown in Equation 11 below:

$$K_{ic} = \hat{I}_c(2) / \hat{I}_c(1) \tag{11}$$

where:
  $\hat{I}_c(2)$ is the second element (y-component) of the vector $\hat{I}_c$; and
  $\hat{I}_c(1)$ is the first element (x-component) of the vector $\hat{I}_c$.

Based on the slope $K_{ic}$ and coordinates $(x_c, y_c)$ of surface location 424, a line equation for a line passing through $(x_c, y_c)$ with a slope $K_{ic}$, representing the incident ray from pointer 184 reflected at surface location 424 is defined (step 720), as shown in Equation 12 below:

$$y = K_{ic}(x - x_c) + y_c \tag{12}$$

The line representing incident ray from pointer 184 reflected at surface location 425 is defined in a similar manner as has been described above. In particular, with the coordinates $(x_e, y_e)$ of surface location 425 having been determined at step 708, the slope $K_{te}$ of a tangent to the concave portion of the surface of the multi-angle reflector 176 at coordinates $(x_e, y_e)$ of surface location 425 is calculated (step 722). More particularly, the slope $K_{te}$ is calculated as the slope of a line connecting two nearby surface locations (selected from the lookup table) centered at coordinates $(x_e, y_e)$ of surface location 425.

With the slope $K_{te}$ of the tangent at surface location 425 having been calculated, the normal $\hat{n}_e$ (a unit vector with a magnitude of 1) at surface location 425 is then calculated (step 724) as shown in Equation 13 below:

$$\hat{n}_e = (-\sin(ale), \cos(ale)) \tag{13}$$

where:
  $ale = \operatorname{atan}(K_{te})$.

The normalized form $\hat{O}_e$ of vector $\vec{O}_e$ representing the ray from surface location 425 to camera entrance pupil 421 is then calculated (step 726), as shown in Equation 14 below:

$$\hat{O}_e = \vec{O}_e / \|\vec{O}_e\| \tag{14}$$

where:
  $\vec{O}_e = (-x_e, y_{cam} - y_e)$; and
  $y_{cam}$ = the y-coordinate of the camera entrance pupil relative to reference point 427.

Based on the law of reflection described above with reference to FIG. 4C, vector $\hat{I}_e$ representing the incident ray from the pointer 184 to the surface location 425 is calculated (step 728), as shown in Equation 15 below:

$$\hat{I}_e = \hat{O}_e - 2\langle \hat{O}_e, \hat{n}_e \rangle \hat{n}_e \tag{15}$$

The slope $K_{ie}$ of vector $\hat{I}_e$ is then calculated (step 730), as shown in Equation 16 below:

$$K_{ie} = \hat{I}_e(2) / \hat{I}_e(1) \tag{16}$$

where
  $\hat{I}_e(2)$ is the second element (y-component) of the vector $\hat{I}_e$; and
  $\hat{I}_e(1)$ is the first element (x-component) of the vector $\hat{I}_e$.

Based on the slope $K_{ie}$ and coordinates $(x_e, y_e)$ of surface location 425, a line equation for a line passing through $(x_e, y_e)$ with a slope $K_{ie}$, representing the incident ray from pointer 184 reflected at surface locate 425 is defined (step 732), as shown in Equation 17 below:

$$y = K_{ie}(x - x_e) + y_e \tag{17}$$

With line equations for lines representing the two incident rays $I_e$ and $I_c$ having been defined as shown in Equations 11 and 16 above, the location $(x_0, y_0)$ of pointer 184 is then calculated based on the intersection of the incident rays $I_e$ and $I_c$ determined by equating the two lines, as shown in Equation 18 below:

$$K_{ic}(x_0-x_c)+y_c=K_{ie}(x_0-x_e)+y_e \quad (18)$$

Figure 8:
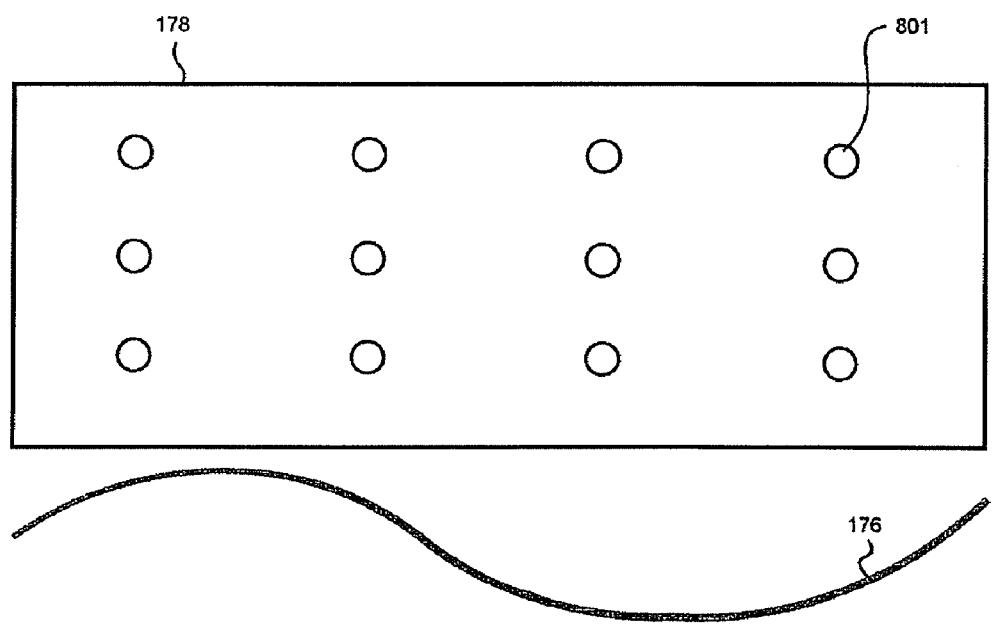
FIG. 8 is a plan view showing a plurality of calibration points on the pointer input region of the interactive input system.

Thus:

$x_0=(K_{ic} x_c-K_{ie} x_e+y_e-y_c)/(K_{ic}-K_{ie})$; and
$y_0=K_{ie}(x_0-x_e)+y_e$ FIG. 8 shows the touch system with a set of calibration points 801 displayed on the pointer input region 178. The calibration points 801 may be projected temporarily on the pointer input region 178, or indicated with permanent physical markings. The positions of the calibration points 801 with respect to the coordinate reference system of the touch system 150 are known.

A calibration procedure is performed to determine exact values for the system parameters, including any offset (dx, dy) of the camera entrance pupil 421 relative to the origin point (0,0) in the reference coordinate system, based on camera parameters including the principal point 422 of the camera, the angular resolution dp of the camera in degrees per pixel, and physical dimensions of the touch system including the distance R of the camera to the nearest edge of the pointer input region along the plane of the pointer input region 178.

Figure 9:
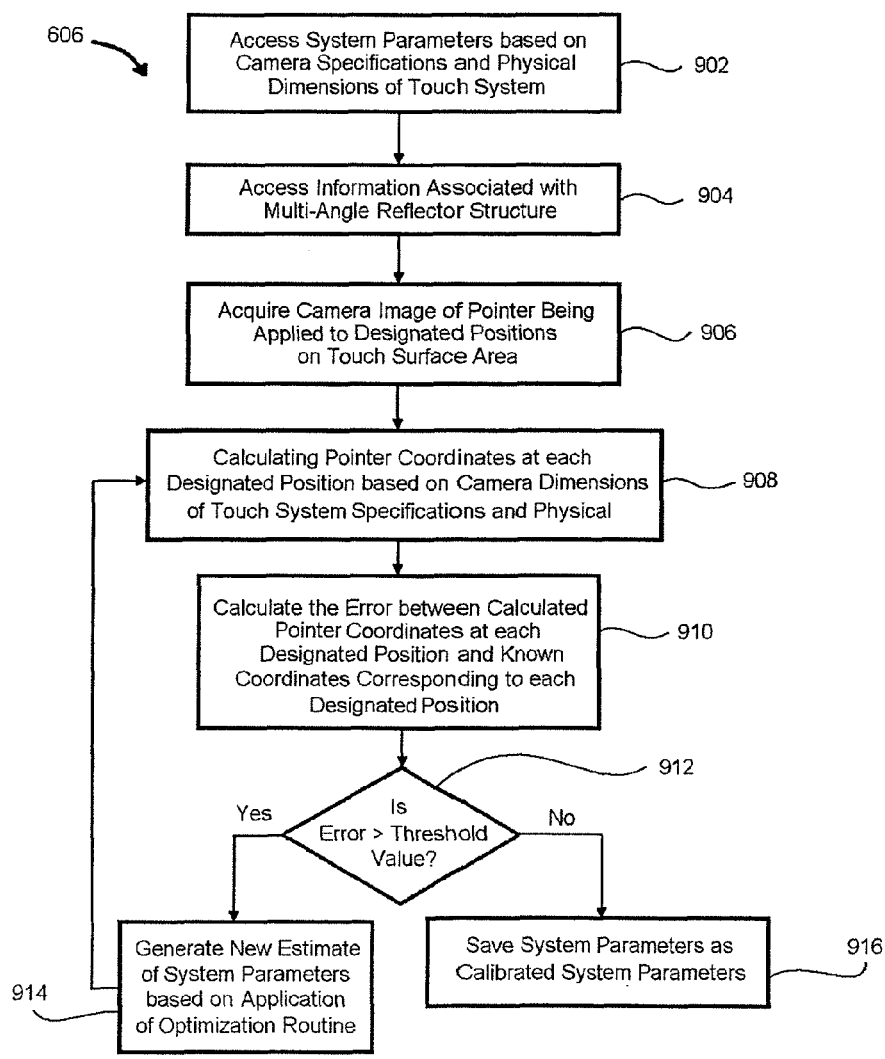
FIG. 9 is a flow chart of a method for determining calibration parameters for the interactive input system.

FIG. 9 shows a flow chart of the calibration procedure performed to determine values for the system parameters described above. First, system parameters based on imaging system specifications and the physical dimensions of the touch system 150 are retrieved (step 902). Information associated with the multi-angle reflector 176, including a lookup table comprising coordinates of the surface of the multi-angle reflector 176, is retrieved (step 904). A user is prompted to place the pointer 184 in contact with the pointer input region 178 at each of a number of locations corresponding to the locations at which calibration points 801 are displayed, in a particular order. The imaging system 172 acquires images of the multi-angle reflection structure including the bright points corresponding to a location at which the pointer 400 is contacting the pointer input region 178 (step 906).

The pointer locations at each of the designated calibration positions 701 are determined as described above with reference to FIGS. 7A to 7D (step 908). Any error between the determined pointer coordinates corresponding to each calibration point 801 and known coordinates of each calibration point 801 is calculated (step 910). The error values calculated in step 910 are then compared to a threshold value (step 912). If any of the error values calculated in step 910 are greater than the threshold value then a revised estimate of the retrieved system parameters is calculated based on the application of an optimization routine (step 914). Preferably, the well known Levenberg-Marquardt optimization routine typically employed for non-linear least squares problems is used to determine the revised estimates of the system parameters. Other optimization routines may alternatively be used.

After the estimates of the system parameters have been revised, the calibration process returns to step 908 and new pointer coordinates are calculated based on the revised system parameter estimates. If at step 912 none of the error values is greater than the threshold value, the system parameters are saved as calibrated system parameters (step 916).

Figure 10:
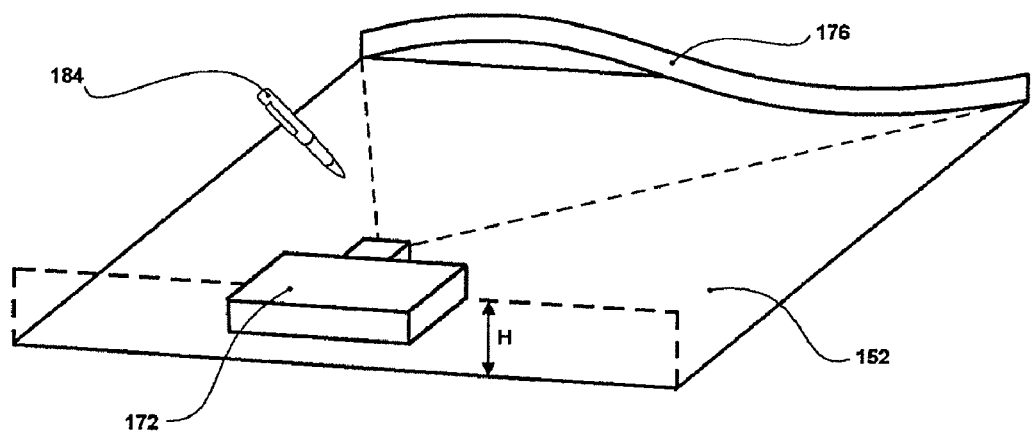
FIG. 10 is an isometric view of an alternative embodiment of an interactive input system.

FIG. 10 shows yet another alternative embodiment of a touch system wherein an imaging system 172 comprising an imaging device aimed at a multi-angle reflector 176 from a position remote from the pointer input region 152. The multi-angle reflector 176 is angled outward from the plane of the pointer input region such that the reflections of a pointer 184 on the multi-angle reflector 176 are within the field of view of the imaging device. Pointer coordinates are calculated using a method similar to that described above, with the exception that a three dimensional coordinate system is used to describe rays of light reflected from the multi-angle reflector 176 to the camera entrance pupil 421 of imaging system 172.

Figure 11A:
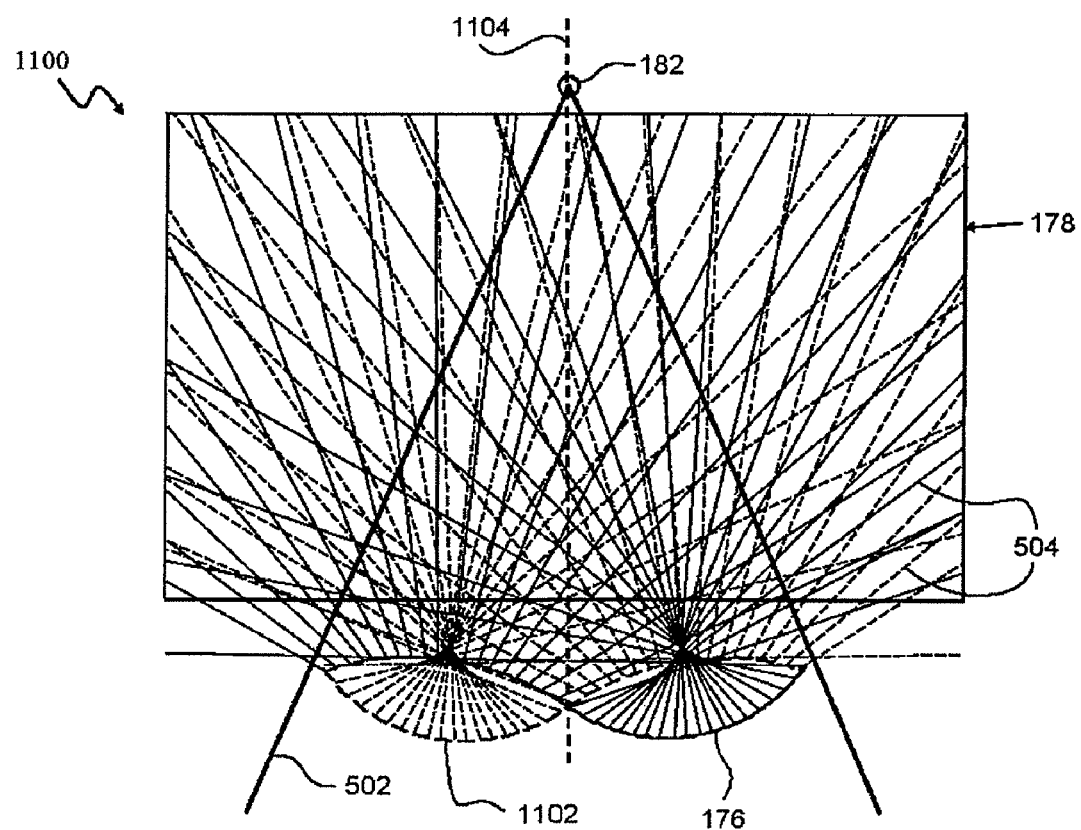
FIG. 11A is a plan view of yet another alternative embodiment of an interactive input system with two reflective areas demonstrating increased touch resolution.
Figure 11B:
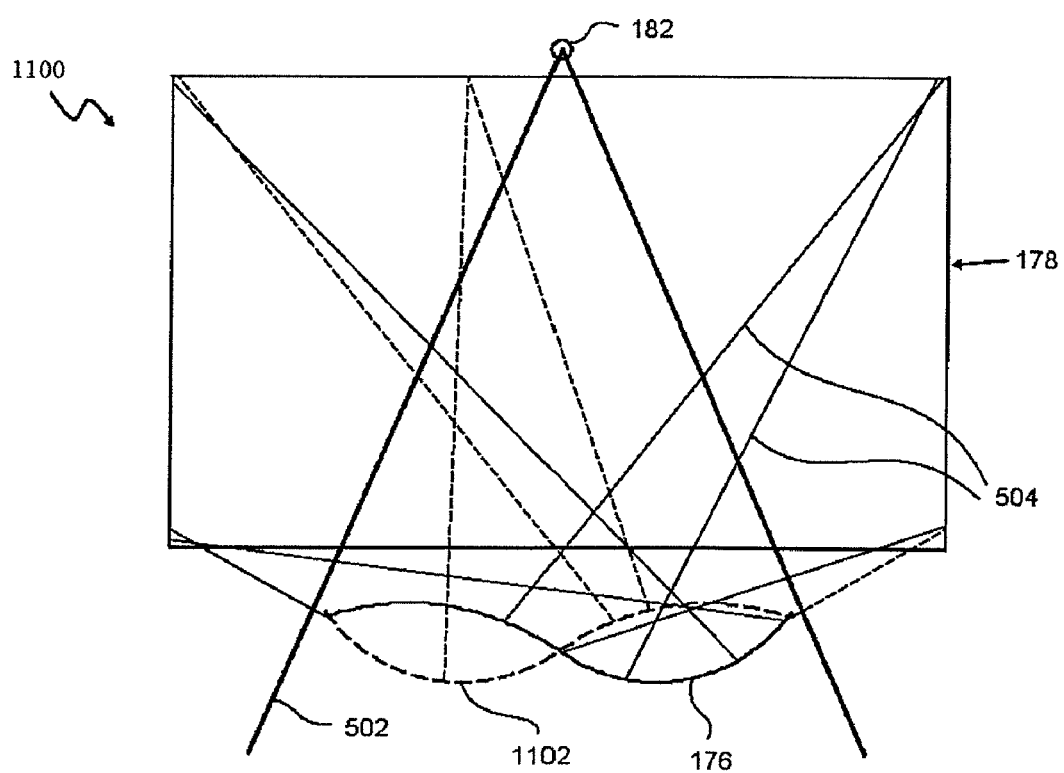
FIG. 11B is a simplified front view of the interactive input system of FIG. 11A.

In an alternative embodiment of FIGS. 11A and 11B and identified as 1100, to improve the touch resolution of the interactive surface 178, a second multi-angle reflector 1102 is added on top of the first multi-angle reflector 176 so that they do not block each other from reflecting any incident light from the pointer input region 178 to the imaging system 172. In this embodiment, the second multi-angle reflector 1102 has a similar profile to 176 but is flipped about the centerline 1104 of the interactive surface 178. A portion of the light rays emitted or reflected by the pointer can be assumed to be traveling generally parallel to the touch surface. These rays are strike the two reflective surfaces, and are reflected back to the imaging system while remaining generally parallel to the touch surface, allowing the imaging system to capture two distinct rows of returns. Rays that are not generally parallel to the touch surface are scattered and not captured by the imaging system.

Using similar algorithms described above for calibration and triangulation applied individually for each multi-angle reflector, the resolution overall of the interactive surface increases as shown by the increased density of the rays 504. Moreover, if one multi-angle reflector 176, 1102 becomes damaged or obscured through dust, dirt, etc then the other multi-angle reflector can compensate for this problem. FIG. 11B demonstrates 5 exemplary pointer positions each showing to incident light rays 504 that are reflected to the camera 182 such that a pointer at either of these positions can be triangulated.

Figure 12:
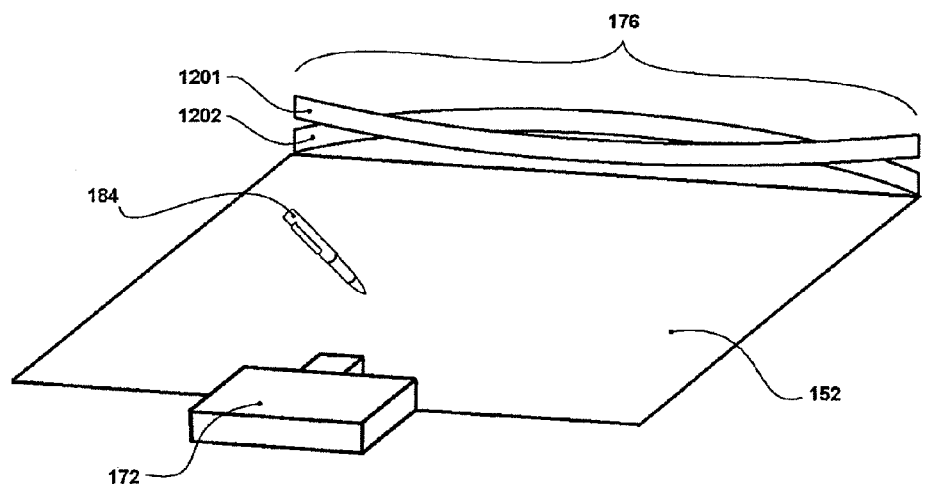
FIG. 12 is a isometric view of another alternative embodiment using convex and concave multi-angle reflectors.

FIG. 12 shows yet another alternative embodiment of a touch system including a multi-angle reflector 176 comprising a convex portion 1201 stacked on top of a concave portion 1202. In this embodiment, a lookup table containing y-coordinates of the multi-angle reflector surface for two different sets of x-coordinates is used to calculate coordinates of a pointer 184 in a pointer input region 152. The position of the pointer reflections in a captured image is used to determine the set of x-coordinates in the lookup table used to determine the pointer location.

Figure 13:
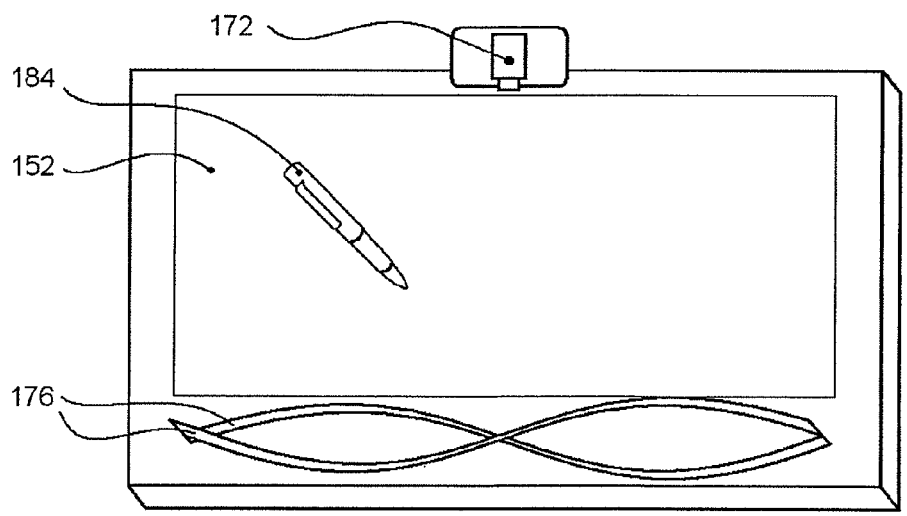
FIG. 13 is a plan view of yet another alternative embodiment demonstrating an optimized multi-angle reflector for the display.

In yet another embodiment of FIG. 13, the shape of the multi-angle reflectors 176 have been optimized for the interactive surface 152. Based on the shape and size of the interactive surface 152, the multi-angle reflectors 176 have been numerically optimized so that the reflections of the pointer 184 are visible in all four corners of the interactive surface 152 by the imaging system 172. One of skill in the art would know that the shape of the multi-angle reflectors 176 can also be optimized based on imaging system position resulting in asymmetrical multi-angle reflectors 176.

Figure 14A:
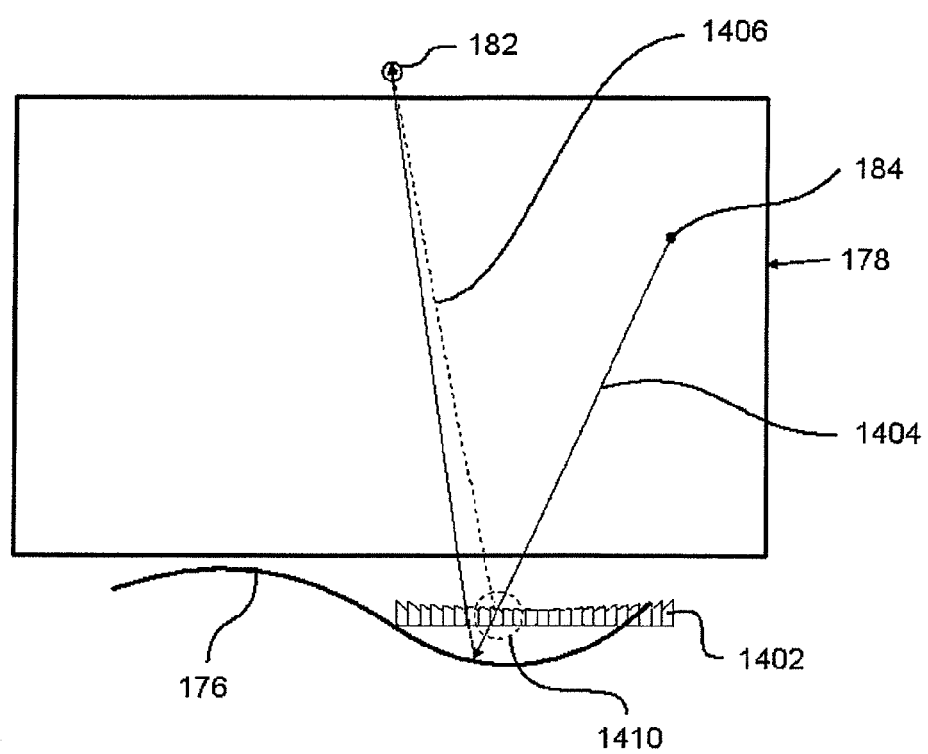
FIG. 14A is a demonstration of the Fresnel-type multi-angle reflector.
Figure 14B:
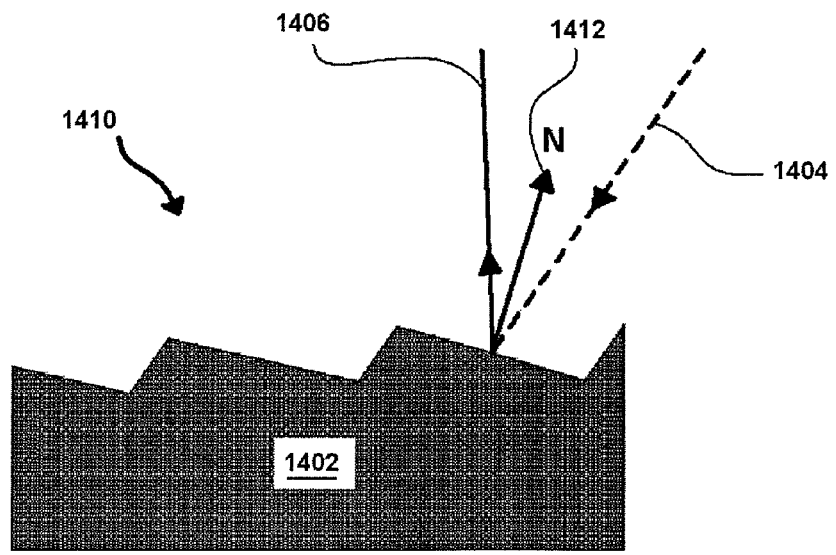
FIG. 14B is a section view of a portion of the interactive input system in FIG. 14A, demonstrating a ray reflection.
Figure 14C:
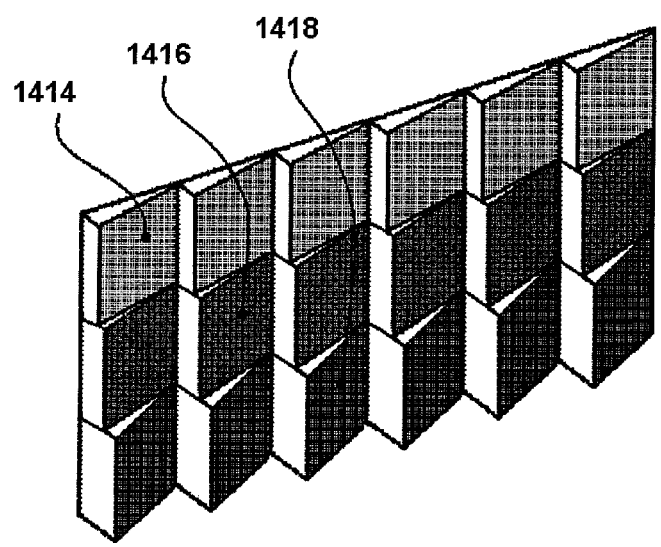
FIG. 14C is a close-up top view of a portion of the interactive input system of FIG. 14A, showing multiple rows of facets.

In yet another embodiment shown in FIG. 14A, instead of using any of the previously mentioned multi-angle reflectors, a Fresnel-type reflector 1402 that approximates an aforementioned multi-angle reflector 176 is used for space efficiency. The incident light from a pointer 184 is reflected by the Fresnel-type reflector 1402 from at least two different positions to the camera 182. The section 1410 is shown in FIG. 14B. As can be seen, the ray 1404 from the pointer 184 reflects in a similar manner as if the ray reflected off of a multi-angle reflector 176. FIG. 14C shows a section of three different multi-angle reflectors 176 being emulated by a Fresnel-type reflector 1402 having three rows 1414, 1416, and 1418 of facets placed side by side. The system described in FIG. 14C further expands on the concept of two stacked multi-angle reflectors, further refining system resolution.

Figure 15A:
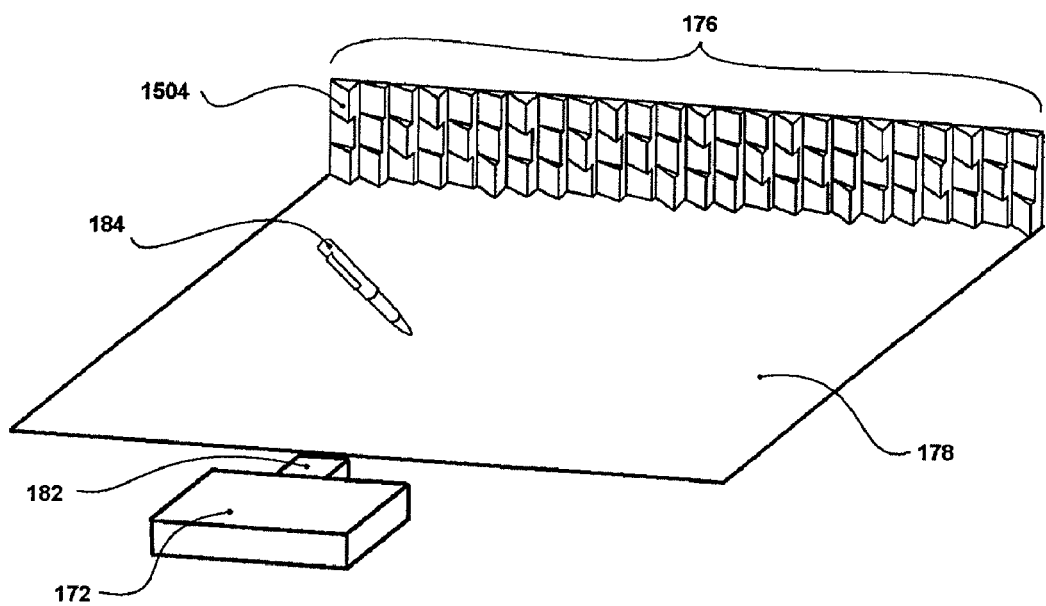
FIG. 15A is an isometric view of an alternative embodiment of an interactive input system.
Figure 15B:
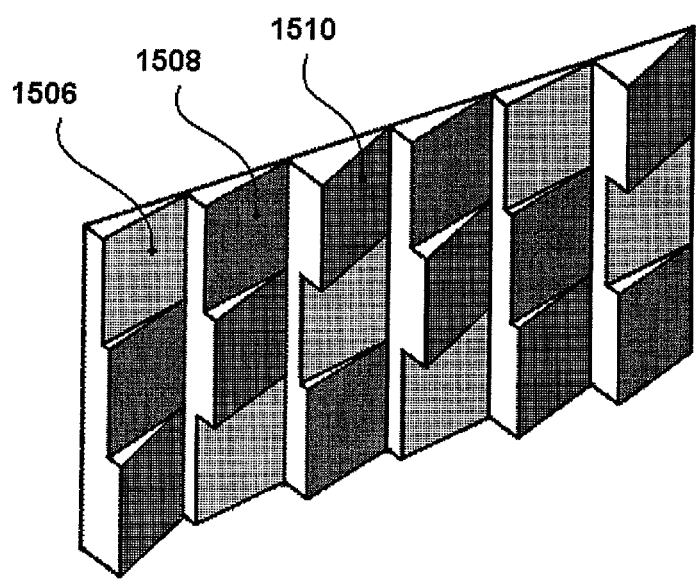
FIG. 15B is an isometric view of a portion of a multi-angle reflector for the interactive input system of FIG. 15A.

In yet another alternative embodiment, FIG. 15A shows a camera based touch system with an imaging system 172 looking generally across an interactive surface 178 at a multi-angle reflector structure 176. A pointer 184 placed in the FOV of the camera 182 is reflected in the multi-angle reflector structure 176 and imaged by the camera 182. FIGS. 15A and 15B show an alternative embodiment of a touch system having an alternative multi-angle reflector 176 comprising a plurality of reflectors or facets 1504 disposed along a single side of the touch surface wherein each of the plurality of reflectors 1504 having a different angular orientation (for example, 1506, 1508, and 1510 in FIG. 15B). Generally, at least two of the plurality of reflectors 1504 directs light from the same area of the interactive surface 178 to the imaging system 172. The method used to calculate coordinates of a pointer 184 on the touch surface 178 is similar to that described above for a multi-angle reflector 176 having a convex portion and a concave portion. More particularly, pointer reflections appear in at least two of the plurality of reflectors 1504 and a lookup table containing coordinate information describing the surface of the multi-angle reflector 176 is employed to calculate the pointer coordinates. Should more than one row of reflectors be used, a lookup table comprising y-coordinates of the surface of the multi-angle reflector 176 for multiple sets of x-coordinates is employed to calculate the location of a pointer 184 in the pointer input region 178. The positions of the pointer reflections in the image captured by imaging system 172 are used to determine the set of x-coordinates in the lookup table, thereby to calculate the pointer location. If more than two reflections appear on the surface of the multi-angle reflector 176, each pair of reflections is used to calculate a set of pointer coordinates, and the sets of pointer coordinates are then averaged to obtain a single pointer coordinate.

Figure 16A:
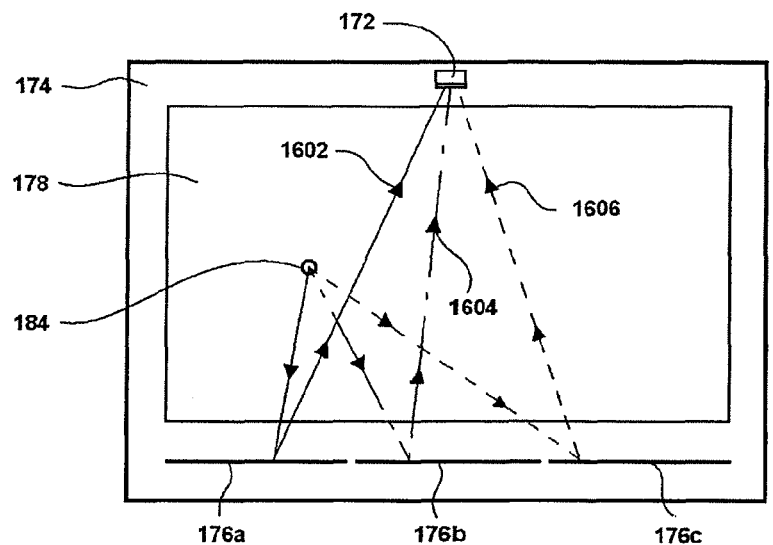
FIG. 16A is plan view of another embodiment of the interactive input system with three multi-angle reflector sections.
Figure 16B:
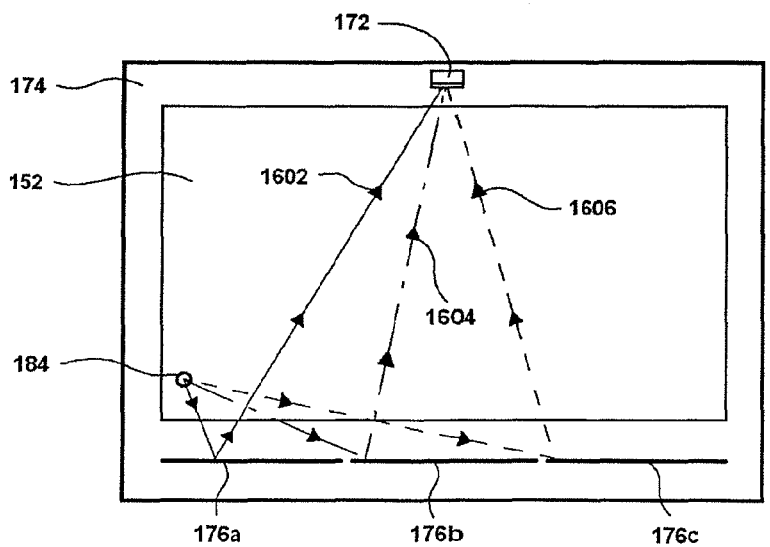
FIG. 16B is another plan view of the interactive input system of FIG. 16A, with the pointer position moved.
Figure 16C:
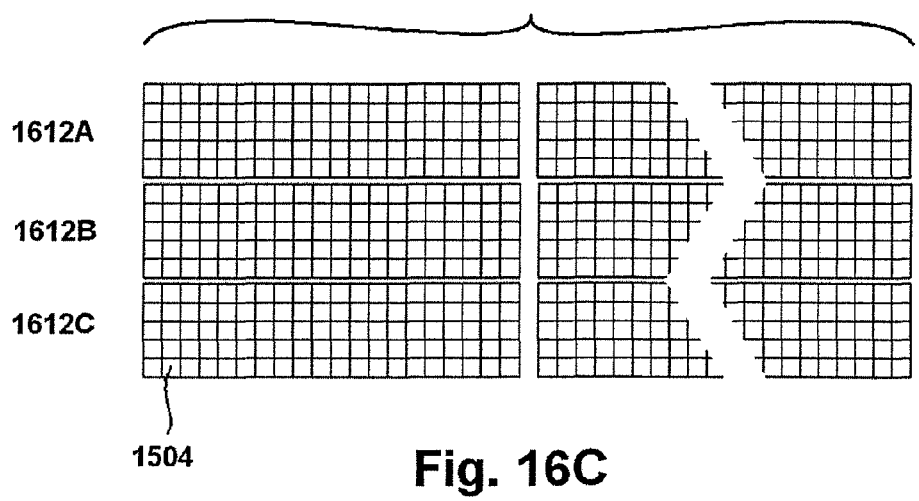
FIG. 16C is top plan view of multi-angle reflector sections of the interactive input system shown in FIG. 16A.

In yet another embodiment, shown in FIGS. 16A, 16B, and 16C, the multi-angle reflector 176 has been subdivided into sections 176a, 176b, and 176c. Each section is further subdivided into a plurality of rows such as 1612a, 1612b, 1612c where each row of each section comprises a plurality of facets 1504. Of the three sections 176a, 176b, 176c, each section has at least one facet 1504 directed at a portion of the interactive surface 178 in order to provide an image of all the portions of the interactive surface 178 to the imaging system 172. The processing load of the master controller 154 is proportional to the number of sections, rows and ultimately facets. Using a 640×480 digital camera 182, a proposed 5×20 pixel facet of size 0.045"×0.18", the total image processing load is 640×15 or 9600 pixels per sample.

FIGS. 16A and 16B shows two examples of a pointer 184 in contact with the interactive surface 178. In this embodiment, three sections 176a, 176b, 176c of the multi-angle reflector 176 have the pointers 184 visible to the imaging system 172. When combined with the other two sections, at least one facet 1504 of each section 176a, 176b, 176c will provide a reflection of a pointer 184 in a particular area to the imaging system 172. So for a 3 section multi-angle reflector, three reflections 1602, 1604, and 1606 are provided of a pointer 184 to the imaging system 172. By having three reflections 1602, 1604, 1606 of the pointer 184 visible to the imaging system 172, hidden pointer 184 anomalies are eliminated.

By having more reflections visible (by using more rows and/or sections of multi-angle reflectors), additional redundancy is added to the interactive system 174 at the expense of processing power required to process the additional rows. For the pointer 184 in the lower left corner of FIG. 16B, rays 1602 and 1604 reflects off of sections 176a and 176b respectively and are received by the imaging system 172. Similarly, ray 1606 reflects off of section 176c and is received by the imaging system 172. The position of the pointer 184 may be calculated using triangulation using only two of the rays 1602 and 1604 for example. The third ray 1606 adds redundancy (in the event that a set of multi-angle reflectors becomes obscured through dirt or dust) and allows further refinement of the coordinates by averaging the results of each triangulation to obtain a single pointer coordinate. The different reflective profiles cause touch resolution to be increased, blind spots to be eliminated, and multiple pointer ambiguities to be reduced or eliminated. The additional rows/sections increases processing requirements as each row/section must be processed. Further, as additional rows are added, the bezel surrounding the display must be increased in depth to accommodate the additional rows. For example, a 7" diagonal screen increases the depth by approximately 1/16" for 5 pixel rows.

One of skill in the art would know that other variations are possible, the facets of the multi-angle reflector can be curved to increase the area of the interactive surface 178 covered by each facet 1504 or to improve the linearity of coverage across the interactive surface 178. The facets could be much larger or smaller.

Figure 17A:
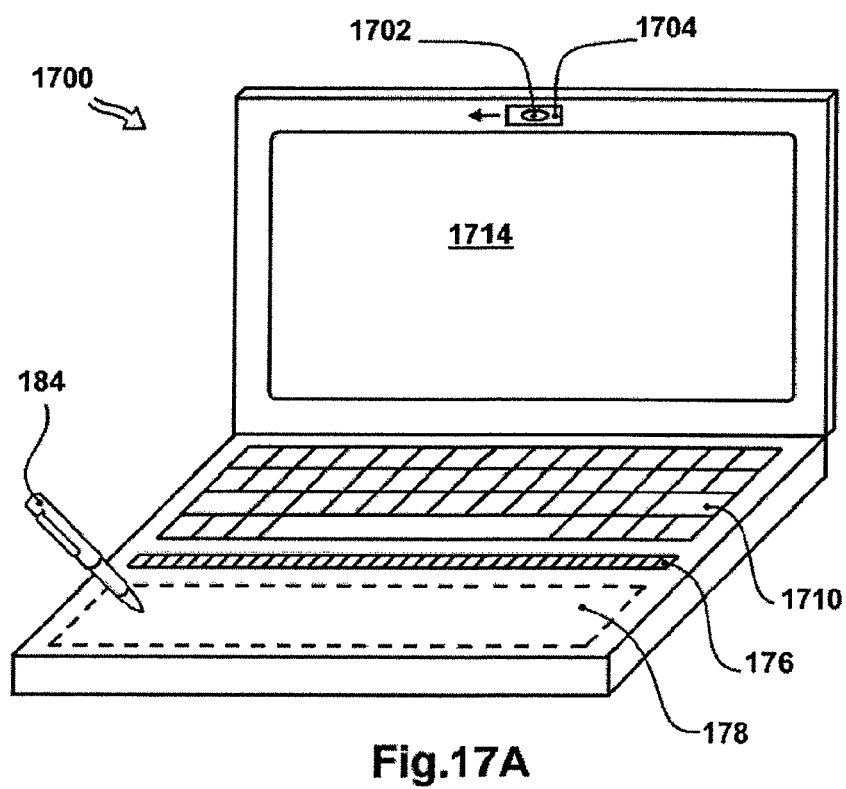
FIG. 17A is an isometric view of another alternative embodiment of an interactive input system integrated into a laptop computer and making use of the built-in webcam of the laptop computer.
Figure 17B:
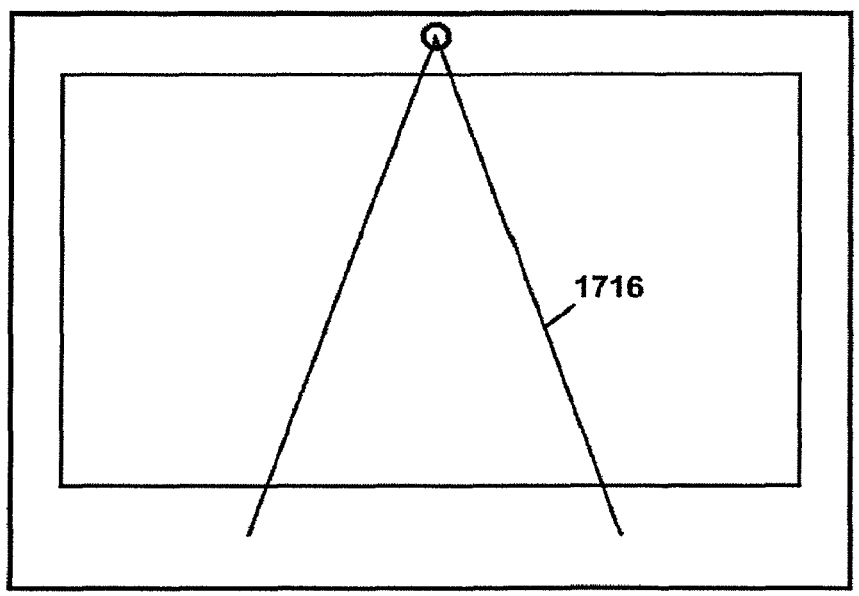
FIG. 17B is a plan view of the interactive input system of FIG. 17A demonstrating the camera field of view without a slideable prism.

FIGS. 17A to 17E show still another embodiment of the present invention wherein the previously described touch system uses a camera 1702 commonly incorporated into laptop, computer monitors, and other types of displays are used for personal video conferencing and pictures of the viewer(s) of the display. As these cameras are becoming standard on many displays, it would reduce costs if it could also be used for touch based interaction. These cameras 1702 are commonly placed at the top center of the display 1714 with a field of view (FOV) extending generally outward from the surface of the display 1714. The field of view 1716 of the camera 1702, in most applications, is approximately 40 degrees as seen in FIG. 17B. The 40 degree field of view 1716 extending outward from the touch surface is generally inadequate for registering gestures or other interaction with the display although it is possible.

Figure 17C:
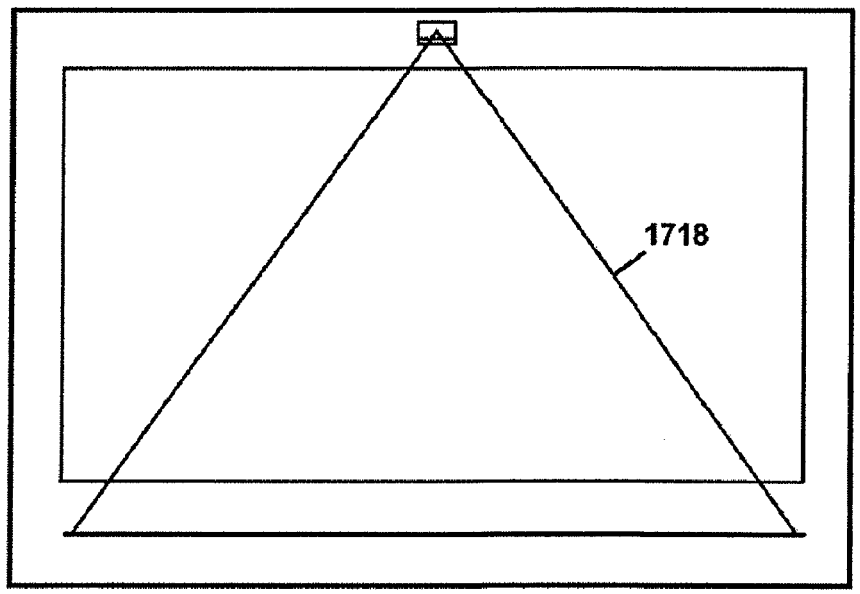
FIG. 17C is a plan view of the interactive input system of FIG. 17A demonstrating the field of view with a slideable prism over the camera.

To improve the field of view and its orientation (as shown in FIG. 17C), a sliding prism 1704 is placed next to the camera 1702 in a position where sliding the prism 1704 to a covering position redirects the field of view of the camera 1702. The sliding prism 1704 orients the field of view to be generally across the display surface 1714 instead of outward from the display surface 1714. Further, the sliding prism expands the field of view (FOV) 1718 to encompass the multi-angle reflector 178, as previously described, located near the interactive area 178 (Alternatively, the display surface 1714 could be made interactive and the multi-angle reflector 178 could be located at the bottom of the display surface 1714 such as in previous embodiments). One of skill in the art would know that adjusting the size of the FOV 1716 is related to the size of the display 1714. As the display size 1714 increases, so must the FOV 1716 of the camera 1702.

A prism 1704 slides in front of the camera 1702 to re-direct the field of view of the camera 1702 to include a multi-angle reflector 178 comprising a plurality of planar mirror segments or facets 1504 at different angles. The multi-angle reflector 178 is at an angle greater than 90 degrees with respect to the plane of the touch sensitive area 178, such that reflections of an illuminated pointer 184 in the touch sensitive area 178 are visible to the camera 1702 when the prism 1704 is positioned over the camera 1702. The illuminated pointer 184 may be an infrared light-emitting pen, or it may be a passive pointer such as a passive pen or a finger that is illuminated by one or more light sources disposed along the edge, at the camera, or at the corners adjacent the edge of the touch sensitive area 178 that the multi-angle reflector 176 is positioned along.

Figure 17D:
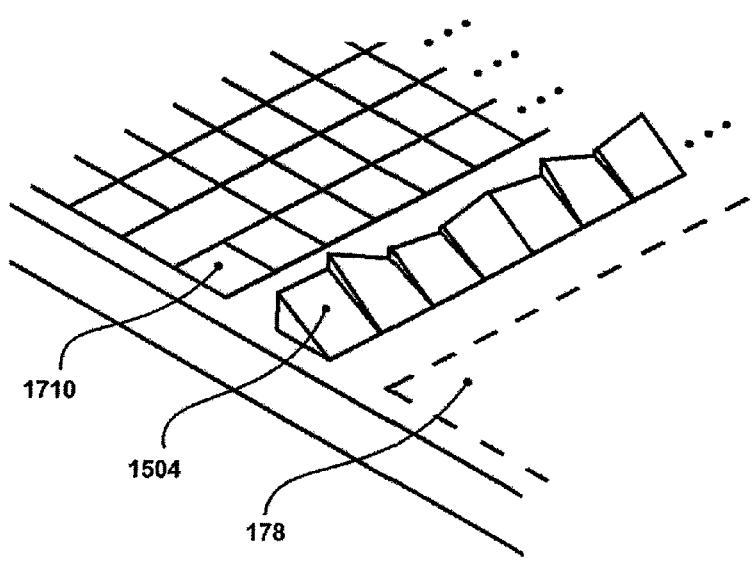
FIG. 17D is an isometric view of the multi-angle reflectors shown in FIG. 17A.

FIG. 17D shows a close up (exaggerated) isometric view of a compound multi-angle reflector 176 where each of the facets is angled along the length of the reflective strip as defined above, as well as angled away from the touch surface depthwise 1504, is directed images of the interactive area 178 towards the camera 1702. Alternatively, the facets could be embedded below the surface of the laptop and be visible through a transparent film in order to reduce their interference with typing on the keyboard.

Likewise, by using multiple rows of compound facets 1504, the system, using a lit pointer, could be used to detect gestures in the three dimensional free space in front of the screen and above the keyboard of a standard laptop computer.

Figure 17E:
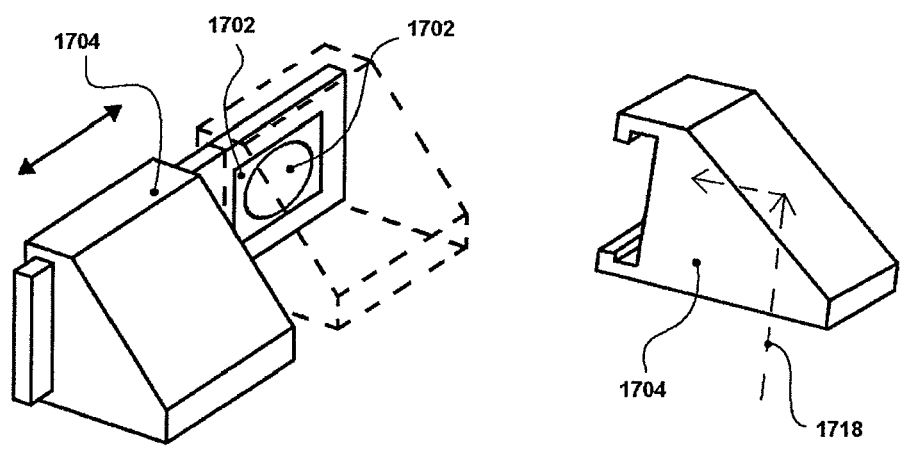
FIG. 17E is a close up isometric view of the slideable prism.

FIG. 17E shows a detailed drawing of one embodiment of the sliding prism 1704 over the camera 1702. The figure also demonstrates how the prism 1704 redirects the field of view 1716 to look across the display 1714.

Another embodiment of the system incorporates a computer learning system (such as artificial intelligence, neural networks, fuzzy logic, etc) where strips of faceted tape could be applied and, by moving a lit pointer around the touch area along a known path, the system could associate reflection patterns to pointer locations. This approach would simplify construction by allowing essentially random facets to be placed on the multi-angle reflector and the reflective profile will be determined. Moreover, if facets of the reflector become damaged or dirty, the computer learning system may be able to compensate for these defects.

Although several embodiments have been presented, one of skill in the art will appreciate that other embodiments of the interactive input system are possible. One such embodiment might employ alternative forms of multi-angle reflectors could be employed to further reduce the amount of physical space required for the reflecting structure. For example, a multi-angle reflector composed of a plurality of non-planar reflectors arranged in rows or a multi-angle reflector with a plurality of concave and convex portions could be employed. Alternatively, a multi-angle reflector described by a mathematical function, as opposed to discrete surface locations stored in a lookup table, could be employed.

The sliding prism could incorporate filtering of specific types of light in order to improve the signal-to-noise ratio of the interactive input system. By incorporating the filter in the prism, the camera can be used as a conventional camera for web-conferencing and provide an optimal system for touch interaction when the prism is placed over the camera.

Those of skill in the art will appreciate that may different wavelengths of light would work with this system, for example, visible, white, IR, etc. However, it is preferable to use a non-visible form of light to reduce interference with the images being displayed.

Those of skill in the art will appreciate that an illuminated passive pointer could be used with the interactive input systems described above, such that the passive pointer is illuminated by a source of illumination that is either located near the imaging system 172 or at some other position that is remote from the pointer. In such an embodiment, the pointer would be reflective in order to provide sufficient light to the multi-angle reflectors. The light source could incorporate an infrared (IR) Light Emitting Diode (LED) for such a passive pointer systems. Techniques such as that described in U.S. patent application Ser. No. 12/118,521 to McGibney et al., assigned to the assignee of the present application, the contents of which are incorporated by reference, could be applied to the interactive input system for additional advantage. The LEDs may be located at the cameras, along the bezels of the display, but preferably should be located outside of the direct FOV of the camera. Alternatively, the LEDs may be located at the multi-angle reflector and a retro-reflective pointer could be used.

Those of skill in the art will appreciate that although the imaging system looks generally across the touch surface in most of the embodiments described, the imaging system may be located at other positions in the interactive input system. For example, the imaging system may be located at a corner of the pointer input region, or it may look down on the pointer input region. At any of these locations, the field of view of the imaging system comprises at least a substantial portion of the multi-angle reflector.

Those of skill in the art will also appreciate that the mathematical procedures and equations described in the preferred embodiment are exemplary and that other mathematical techniques could be used to obtain the pointer coordinates. For example, other techniques such as Newton's method could be used to estimate the tangent vectors to points along the surface of the multi-angle reflector.

Those of skill in the art will also appreciate that other processing structures could be used in place of the master controller and computer processor described in the preferred embodiment. The master controller could be eliminated and its processing functions could be performed by the computer. Various implementations of the master controller are possible. Although the preferred embodiment of the invention uses a DSP in the camera assembly, other processors such as microcontrollers, central processing units (CPUs), graphics processing units (GPUs), or cell-processors could be used in place of the DSP. Alternatively, the DSP and the master controller could be integrated.

Those of skill in the art will appreciate that although the embodiments presented in this application incorporate a liquid crystal display (LCD) display screen, other types of display screens such as a plasma display screen, or a projector and screen could be used in place of an LCD display screen.

Although preferred embodiments have been described, those of skill in the art will appreciate that variations and modifications may be made without departing from the spirit and scope thereof as defined by the appended claims.

What is claimed is:

1. An interactive input system, comprising:
   a pointer input region;
   a multi-angle reflecting structure located along a single side of the pointer input region and operable to reflect radiation from a pointer within the pointer input region from at least two surface locations of the multi-angle reflecting structure, wherein the at least two surface locations each have different respective angles;
   an imaging system operable to capture within at least a portion of the pointer input region images of the reflected radiation located within a field of view of the imaging system; and
   processing structure for determining the location of the pointer relative to the pointer input region based on the at least one image.

2. The system according to claim 1, further comprising a radiation source operable to illuminate the pointer.

3. The system according to claim 2, wherein the radiation source comprises an optical device.

4. The system according to claim 2, wherein the radiation source comprises an optical system operable to illuminate the touch screen. surface comprises a convex shape.

5. The system according to claim 1, wherein the processing structure is adapted to receive the captured images and generate pixel data associated with the captured images.

6. The system according to claim 5, wherein the processing structure generates pointer location data based on the pixel data.

7. The system according to claim 1, wherein the multi-angle reflecting structure comprises:
a first region having a first non-planar surface; and
a second region having a second non-planar surface,
wherein the first non-planar surface reflects radiation to the imaging system along a first path and the second non-planar surface reflects the radiation to the imaging system along a second path.

8. The system according to claim 7, wherein the first non-planar surface comprises a concave shape.

9. The system according to claim 7, wherein the second non-planar surface comprises a convex shape.

10. In an interactive input system, a method of detecting the position of a pointer associated with a pointer input region, the method comprising:
illuminating the pointer when applied to the pointer input region;
reflecting along a single side of the pointer input region a first incident radiation signal received from the illuminated pointer;
reflecting along the single side of the pointer input region a second incident radiation signal received from the illuminated pointer;
acquiring an image of the reflected first and second incident radiation signals; and
processing the acquired image to determine the position of the pointer relative to the pointer input region using triangulation.

11. The method according to claim 10, wherein illuminating the pointer comprises illuminating the pointer input region such that the pointer is illuminated in response to contact with the pointer input region.

12. The method according to claim 10, wherein illuminating the pointer comprises illuminating the pointer input region such that the pointer is illuminated in response to being placed in proximity with the pointer input region.

13. The method according to claim 10, wherein illuminating the pointer comprises using an active pointer device to contact the pointer input region.

14. The method according to claim 10, further comprising:
acquiring information associated with at least one surface reflecting the first and the second incident optical signal.

15. The method of claim 14, wherein the information comprises a mathematical function representative of the at least one surface.

16. The method according to claim 14, wherein the information comprises data associated with mapping a plurality of points along the surface to slope information associated with the first and the second incident radiation signals.

17. An interactive input system, comprising:
a pointer input region;
a multi-angle reflector located along a single side of the pointer input region and operable to reflect radiation received from an object associated with the pointer input region from at least two non-planar surfaces of the multi-angle reflector; and
an imaging system operable to capture within at least a portion of the pointer input region images of the reflected radiation located within a field of view of the imaging system for determining the location of the object relative to the pointer input region.

18. The system according to claim 17, wherein the at least two non-planar surfaces are oriented at different angles.

19. The system according to claim 17, wherein the at least two non-planar surfaces comprise a shape defined by a mathematical function.

20. The system according to claim 19, wherein the shape comprises a concave and convex shape.

21. The system according to claim 19, wherein the mathematical function comprises a sinusoidal function.

22. An interactive input system, comprising:
a pointer input region;
a plurality of reflectors located along a single side of the pointer input region and operable to reflect radiation received from an object associated with the pointer input region from each of the plurality of reflectors, wherein each of the plurality of reflectors comprise a different shape; and
an imaging system operable to capture within at least a portion of the pointer input region images of the reflected radiation located within a field of view of the imaging system for determining the location of the object relative to the pointer input region.

23. The system according to claim 22, wherein the different shape comprise a concave shape or a convex shape.

24. An interactive input system, comprising:
a pointer input region;
a plurality of reflectors located along a single side of the pointer input region and operable to reflect radiation received from an object associated with the pointer input region from each of the plurality of reflectors, wherein each of the plurality of reflectors comprise a different angular orientation; and
an imaging system operable to capture within at least a portion of the pointer input region images of the reflected radiation located within a field of view of the imaging system for determining the location of the object relative to the pointer input region.

25. The system according to claim 24, wherein each of the plurality of reflectors are comprised of the same shape.

* * * * *